United States Patent
Johnson et al.

(10) Patent No.: US 12,480,291 B2
(45) Date of Patent: Nov. 25, 2025

(54) FAUCET HANDLE ASSEMBLY

(71) Applicant: Delta Faucet Company, Indianapolis, IN (US)

(72) Inventors: Brian Wayne Johnson, Muncie, IN (US); Madeline Clare Ryals, Indianapolis, IN (US)

(73) Assignee: Delta Faucet Company, Indianapolis, IN (US)

( * ) Notice: Subject to any disclaimer, the term of this patent is extended or adjusted under 35 U.S.C. 154(b) by 230 days.

(21) Appl. No.: 18/198,595

(22) Filed: May 17, 2023

(65) Prior Publication Data

US 2023/0407612 A1    Dec. 21, 2023

Related U.S. Application Data

(60) Provisional application No. 63/353,132, filed on Jun. 17, 2022.

(51) Int. Cl.
 *E03C 1/04* (2006.01)
 *F16K 31/60* (2006.01)

(52) U.S. Cl.
 CPC ............ *E03C 1/0412* (2013.01); *F16K 31/60* (2013.01)

(58) Field of Classification Search
 CPC ....... E03C 1/0412; F16K 31/60; F16K 31/602
 See application file for complete search history.

(56) References Cited

U.S. PATENT DOCUMENTS

| 4,593,430 | A  | * | 6/1986  | Spangler .................. B25G 3/18 |
|           |    |   |         |                          16/DIG. 30 |
| 4,762,144 | A  | * | 8/1988  | Ford ....................... F16K 31/60 |
|           |    |   |         |                            137/382.5 |
| 5,337,450 | A  |   | 8/1994  | Martia |
| 7,987,869 | B2 | * | 8/2011  | Rosko ..................... F16K 3/085 |
|           |    |   |         |                            137/315.15 |
| 8,381,759 | B1 |   | 2/2013  | Chen |
| 8,881,755 | B2 | * | 11/2014 | Thomas ................ F16K 27/045 |
|           |    |   |         |                               137/271 |
| 9,255,387 | B2 | * | 2/2016  | Yang ...................... F16K 31/602 |
| 10,774,946| B2 | * | 9/2020  | Mooren ................... B25G 3/18 |
| 11,060,267| B2 |   | 7/2021  | Mooren et al. |
| 2005/0138726 | A1 | | 6/2005 | Daly |
| 2006/0085908 | A1 | | 4/2006 | Daly |

(Continued)

FOREIGN PATENT DOCUMENTS

| CN | 103574146 | 2/2014 |
| CN | 104565479 | 4/2015 |

(Continued)

OTHER PUBLICATIONS

Delta Faucet Company, Two Handle Widespread Bathroom Faucets, Maintenance & Installation Sheet, Oct. 13, 2020, 16 pages.

(Continued)

*Primary Examiner* — Janie M Loeppke
(74) *Attorney, Agent, or Firm* — Bose McKinney & Evans LLP

(57) ABSTRACT

A faucet handle assembly configured to properly align a faucet handle relative to a valve assembly. A handle bushing includes an alignment rib received within an alignment slot of the faucet handle. The handle and the handle bushing are operably coupled together by engagement of a flexible tab of the handle bushing with an inner surface of the handle.

12 Claims, 22 Drawing Sheets

(56) References Cited

U.S. PATENT DOCUMENTS

2020/0362984 A1 11/2020 Mooren et al.
2021/0254748 A1 8/2021 DeVries et al.
2022/0127830 A1 4/2022 Hayes et al.

FOREIGN PATENT DOCUMENTS

CN 204267825 4/2015
CN 206234452 6/2017

OTHER PUBLICATIONS

Brizo, Quick Connect Two Handle Widespread Faucet, Maintenance and Installation Sheet, Apr. 1, 2022, 12 pages.

\* cited by examiner

FAUCET HANDLE ASSEMBLY

CROSS-REFERENCE TO RELATED APPLICATION

The present application claims priority to U.S. Provisional Patent Application Ser. No. 63/353,132, filed Jun. 17, 2022, the disclosure of which is expressly incorporated herein by reference.

BACKGROUND AND SUMMARY OF THE DISCLOSURE

The present disclosure relates to a faucet handle assembly including an interface between a valve handle and a valve stem. More specifically, an illustrative embodiment of the present disclosure relates to a push-fit interface between a valve handle and a valve stem for a faucet including ribs of different configurations to allow for proper rotational orientation of the assembly.

It is known to use a push-fit assembly of handles to a valve cartridge. Typically, the assembly methods require splines or some other frictional means of infinite rotation to allow for proper rotational alignment of the valve handle. This may be troublesome to the user as it may take several attempts to correctly rotationally orient the valve handle to the valve cartridge and the escutcheon, and thereby to the faucet spout.

As such, there is a need for a device that couples a handle to a valve assembly while facilitating proper rotational orientation therebetween.

According to an illustrative embodiment of the present disclosure, a faucet handle assembly includes a handle bushing having a lower body with a general rib supported by the lower body and having a first rib profile, an alignment rib supported by the lower body in spaced relation to the general rib and having a second rib profile, wherein the first rib profile is different from the second rib profile, and a flexible upper tab with a downwardly facing surface. A handle includes a handle extension with a general slot having a first slot profile and an alignment slot having a second slot profile, wherein the first slot profile is different from the second slot profile. The handle bushing and the handle are aligned in the proper rotational orientation when the general rib is received within the general slot, and the alignment rib is received within the alignment slot. The handle and the handle bushing are operably coupled together, wherein the downwardly facing surface of the flexible upper tab of the handle bushing is biased against an upwardly facing surface of the handle extension.

According to a further illustrative embodiment of the present disclosure, a faucet handle assembly includes a valve assembly with a valve stem, a handle bushing having an upper body, a lower body operably coupled to the valve stem, a first rib extending radially outwardly from the lower body and having a first rib profile, and a second rib extending radially outwardly from the lower body in circumferentially spaced relation to the first rib and having a second rib profile, wherein the first rib profile is different from the second rib profile. A handle includes a handle extension having a first slot with a first slot profile and a second slot having a second slot profile, wherein the first slot profile is different from the second slot profile. A coupler is defined between the upper body of the handle bushing and the handle extension of the handle, the coupler operably coupling the handle bushing to the handle.

According to another illustrative embodiment of the present disclosure, a faucet handle assembly includes a valve assembly having a valve stem, a handle bushing including an upper body, a lower body operably coupled to the valve stem, the lower body having a cylindrical sidewall with a general rib supported by the lower body and having a first rib profile, an alignment rib supported by the lower body in circumferentially spaced relation to the general rib and having a second rib profile, wherein the first rib profile is different from the second rib profile. The upper body includes a plurality of circumferentially spaced flexible upper tabs, each of the upper tabs having a radially outwardly extending protrusion with a downwardly facing surface.

The illustrative faucet handle assembly further includes a handle having a handle extension with a cylindrical sidewall having an inner surface defining an internal chamber, a radially outwardly extending recess formed within the inner surface of the cylindrical sidewall and having upwardly facing surface, a general slot with a first slot profile formed within the cylindrical sidewall, and an alignment slot with a second slot profile formed within the cylindrical sidewall, wherein the first slot profile is different from the second slot profile. The handle bushing and the handle are aligned in the proper orientation when the general rib is received within the general slot, and the alignment rib is received within the alignment slot. The handle and the handle bushing are operably coupled together, wherein the protrusions of the upper tabs of the handle bushing are received within the recess of the handle extension, such that the downwardly facing surface of each flexible upper tab of the handle bushing is biased against the upwardly facing surface of the handle extension.

Additional features and advantages of the present invention will become apparent to those skilled in the art upon consideration of the following detailed description of illustrative embodiments exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
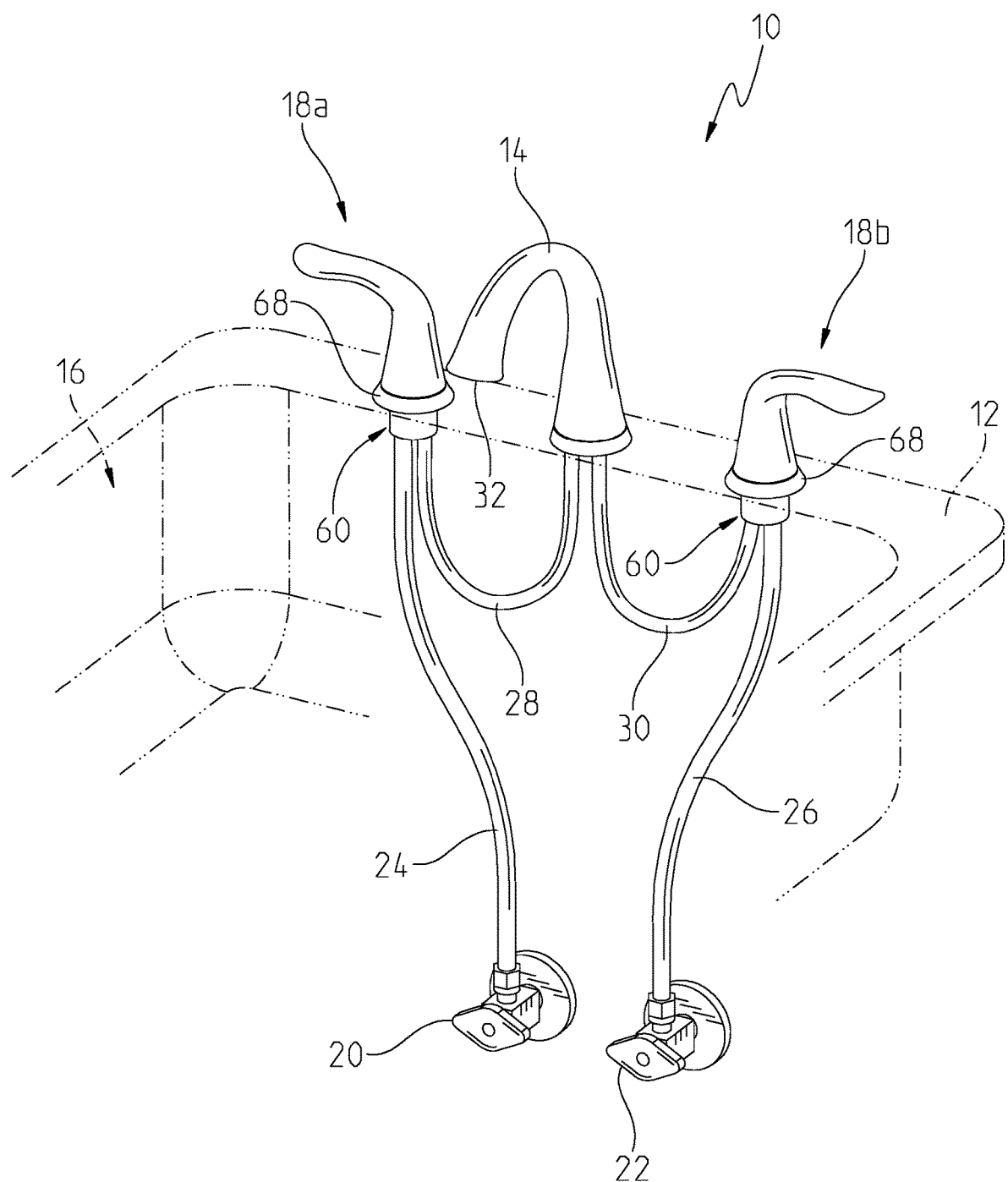
FIG. 1 is a perspective view of an illustrative faucet including a faucet handle assembly according to an illustrative embodiment of the present disclosure.

For the purposes of promoting and understanding the principles of the present disclosure, reference will now be made to the embodiments illustrated in the drawings, which are described herein. The embodiments disclosed herein are not intended to be exhaustive or to limit the invention to the precise form disclosed. Rather, the embodiments are chosen and described so that others skilled in the art may utilize their teachings. Therefore, no limitation of the scope of the claimed invention is thereby intended. The present invention includes any alterations and further modifications of the illustrated devices and described methods and further applications of principles in the invention which would normally occur to one skilled in the art to which the invention relates.

Referring initially to FIG. 1, an illustrative faucet 10 is shown coupled to a mounting deck, such as a sink deck 12. The faucet 10 illustratively includes a delivery spout 14 for discharging water into a sink basin 16 surrounded by the sink deck 12. Illustratively, a hot water faucet handle assembly 18a and a cold water faucet handle assembly 18b are illustratively mounted on the sink deck 12 in spaced relation to, and on opposite sides of, the delivery spout 14. Hot water is supplied from a hot water source 20 (illustratively, a conventional hot water stop) to the hot water faucet handle assembly 18a. Similarly, cold water is supplied from a cold water source 22 (illustratively, a conventional cold water stop) to the cold water faucet handle assembly 18b.

Illustratively, hot water and cold water inlet conduits 24 and 26 fluidly couple the hot water and cold water sources 20 and 22 to the hot water and cold water faucet handle assemblies 18a and 18b, respectively. As is known, the faucet handle assemblies 18a and 18b control water flow to hot water and cold water outlet conduits 28 and 30, respectively, and subsequently to a water outlet 32 of the delivery spout 14. The hot water and cold water inlet conduits 24 and 26, and the hot water and cold water outlet conduits 28 and 30 are illustratively formed of a flexible tubular material, such as a polymer (e.g., a cross-linked polyethylene (PEX)).

In the following detailed description and accompanying drawings, the hot water faucet handle assembly 18a is illustrated and described in further detail. However, the hot water and the cold water faucet handle assemblies 18a and 18b are substantially identical except for their relative rotation during operation (e.g., counter-clockwise from an off position to a full water flow position for the hot water assembly 18a, and clockwise from an off position to a full water flow position for the cold water faucet handle assembly 18b).

Figure 2:
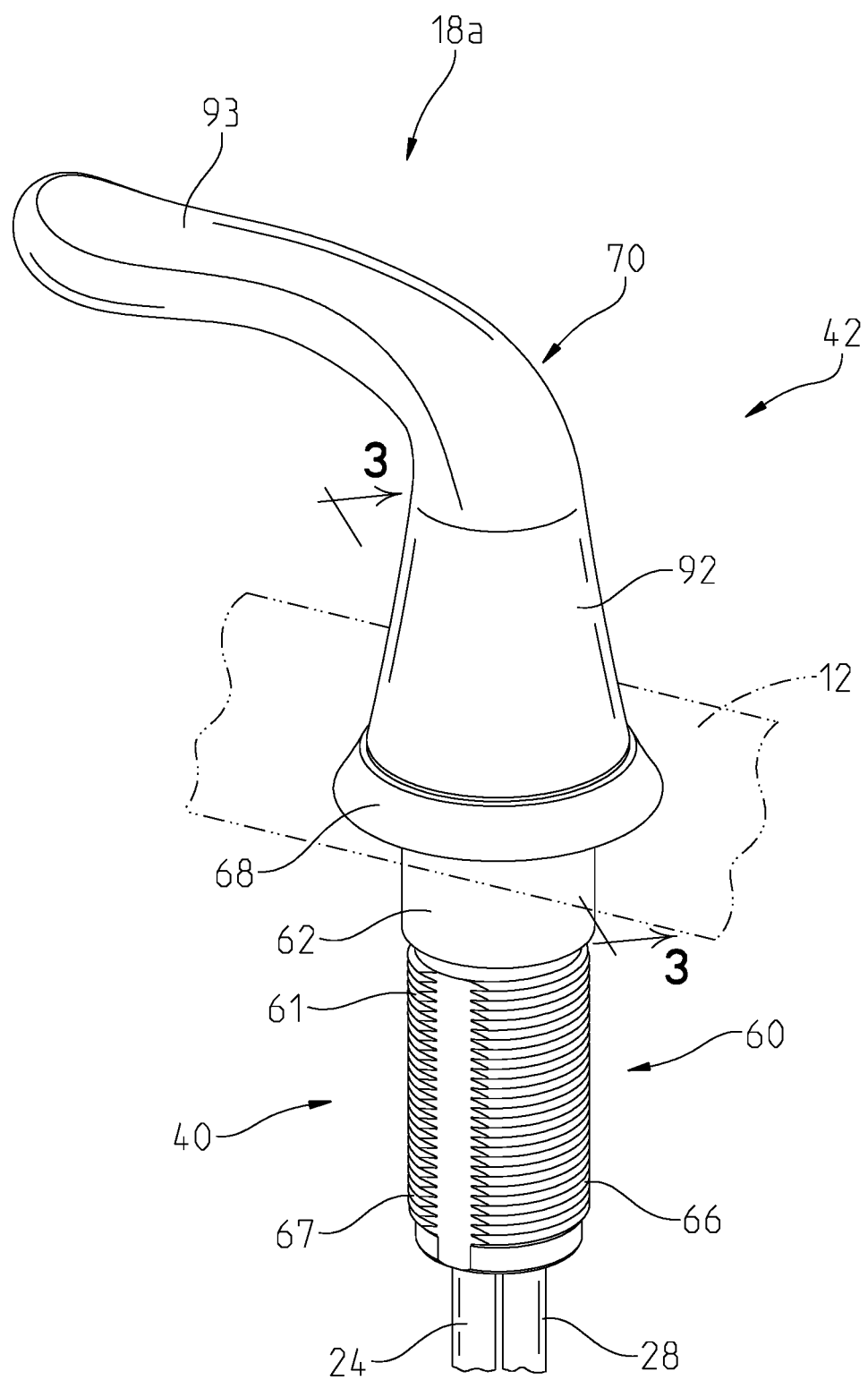
FIG. 2 is a perspective view of an illustrative faucet handle assembly of the present disclosure.
Figure 3:
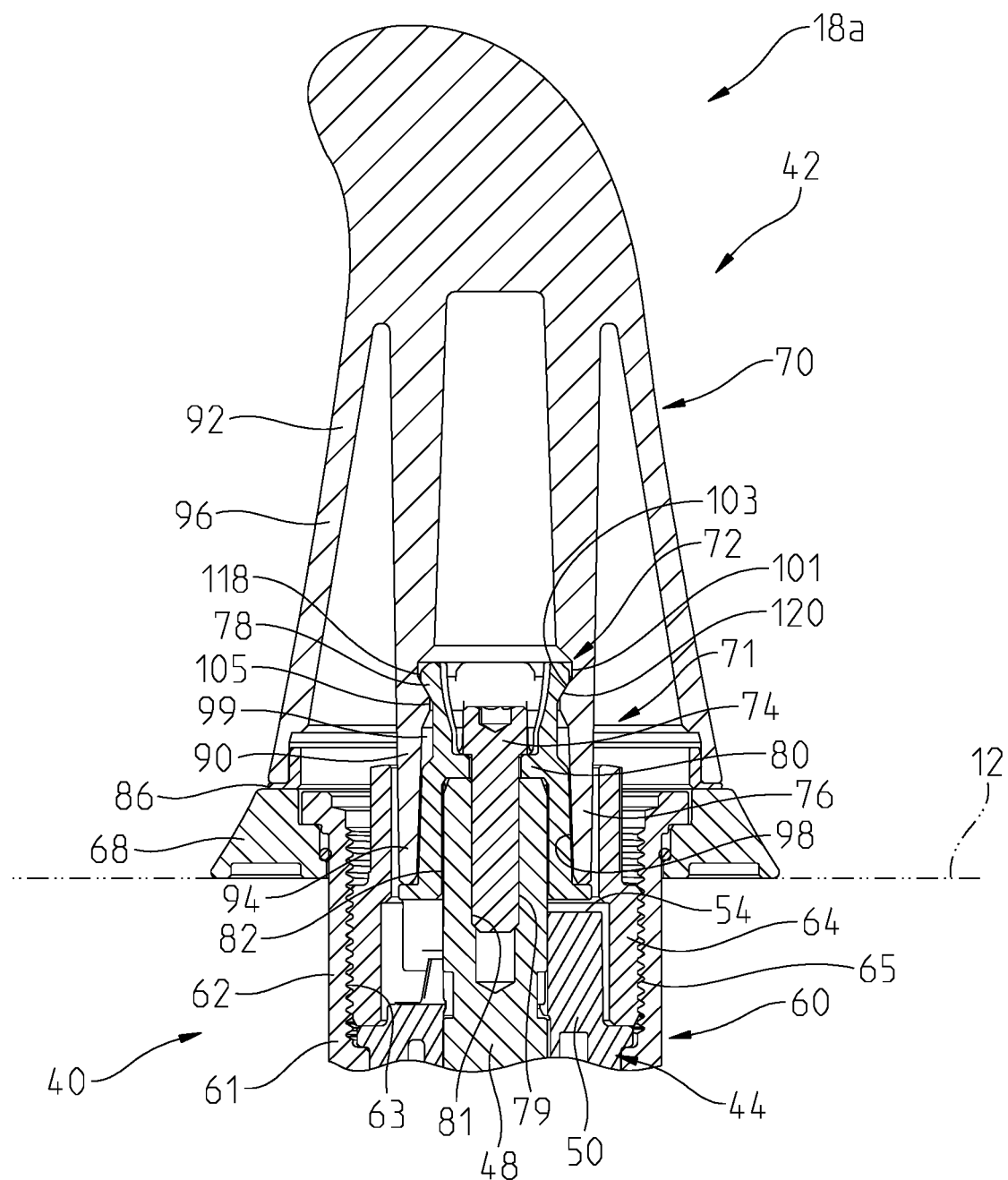
FIG. 3 is a cross-sectional view of the illustrative faucet handle assembly taken along line 3-3 of FIG. 2.
Figure 4:
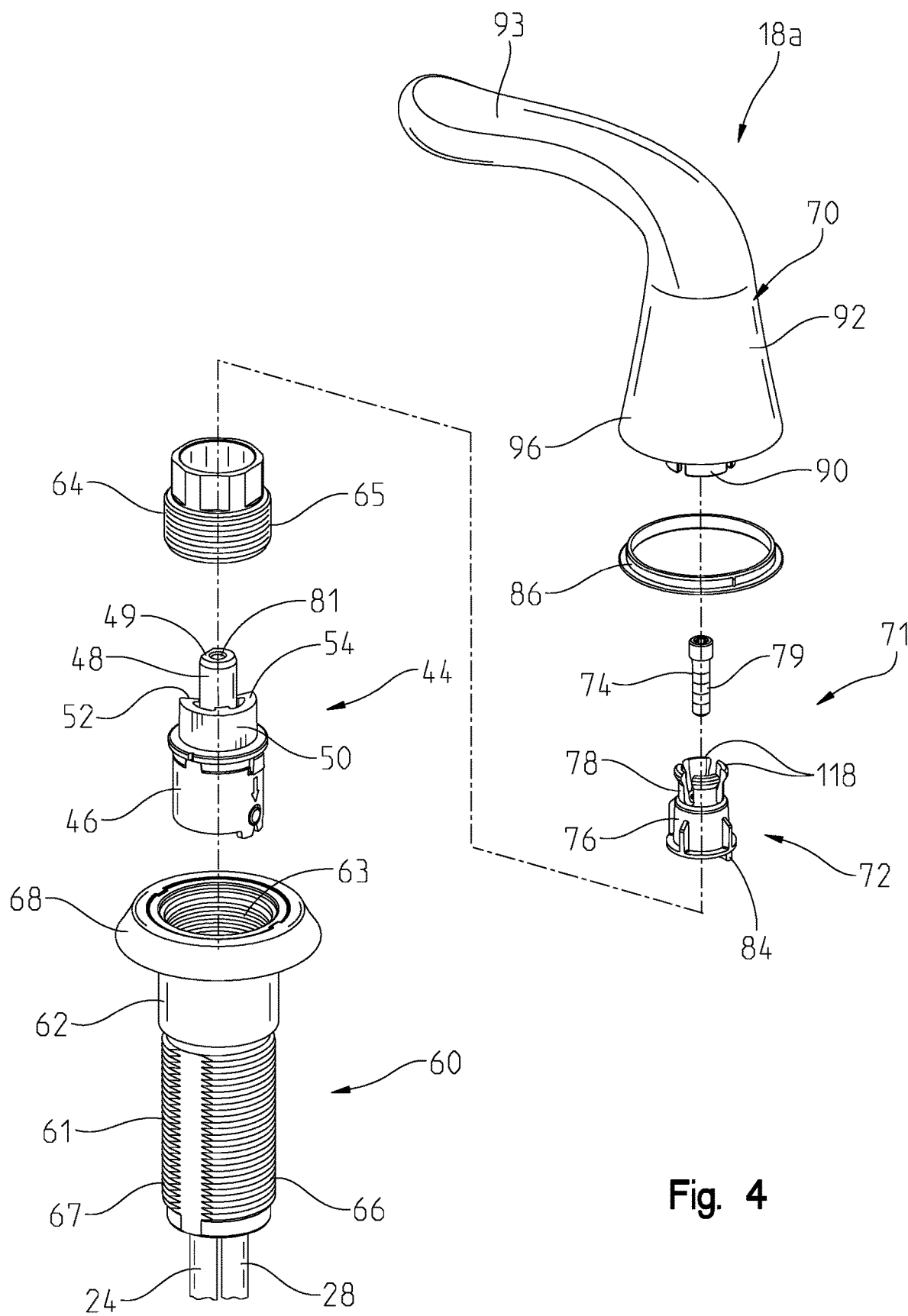
FIG. 4 is a upper exploded perspective view of the illustrative faucet handle assembly of FIG. 2.

With reference to FIGS. 2-6, the faucet handle assembly 18a illustratively includes a lower portion 40 extending below the sink deck 12, and an upper portion 42 extending above the sink deck 12 (FIGS. 1 and 2). The lower portion 40 illustratively includes a flow control valve cartridge or valve assembly 44 fluidly coupled to the water inlet conduit 24 and the water outlet conduit 28. The illustrative valve assembly 44 includes a valve housing 46 supporting a rotatable valve stem 48. The valve stem 48 illustratively includes a flat 49 defining a D-shaped cross-section (FIG. 4). The valve stem 48 is rotatable relative to the valve housing 46 in a first direction (e.g., counter-clockwise) and an opposite second direction (e.g., clockwise) to control (e.g., permit and inhibit, or increase and decrease, respectively) water flow through the valve assembly 44.

The valve assembly 44 illustratively includes a semicircular extension 50 that includes an opening or slot 52 cooperating with the valve stem 48 which extends above an upper surface 54, thereby defining a temperature limit stop as further detailed herein. In some illustrative embodiments, the valve assembly 44 may be of the type further detailed in U.S. Pat. No. 8,881,755 to Thomas et al., the disclosure of which is expressly incorporated herein by reference.

The illustrative valve assembly 44 is supported by a valve body or mounting shank 60 including a cylindrical sidewall 61 having an upper portion 62 with internal threads 63. A bonnet nut 64 includes external threads 65 that engage the internal threads 63 of the mounting shank 60 to secure the valve assembly 44 within the mounting shank 60. As shown in FIG. 4, the mounting shank 60 also includes a lower shaft 66 that extends through a mounting aperture (not shown) in the sink deck 12. The lower shaft 66 includes external threads 67 that couple to a mounting nut (not shown) for securing the mounting shank 60 to the sink deck 12. An upper escutcheon 68 is operably coupled to the mounting shank 60 and is supported above the sink deck 12.

The upper portion 42 of the faucet handle assembly 18a illustratively includes a handle 70 that is operably coupled to the valve stem 48 via a push fit coupler or interface 71 including a handle bushing 72 and a fastener 74 (e.g., a threaded bolt). The illustrative handle bushing 72 includes a lower body 76, an upper body 78 and a lateral wall 80 positioned between the lower body 76 and the upper body 78. The fastener 74 extends through the lateral wall 80 to secure the handle bushing 72 to the valve stem 48 (FIG. 3). More particularly, a threaded shaft 79 of the fastener 74 engages with a threaded opening 81 of the valve stem 48.

Figure 5:
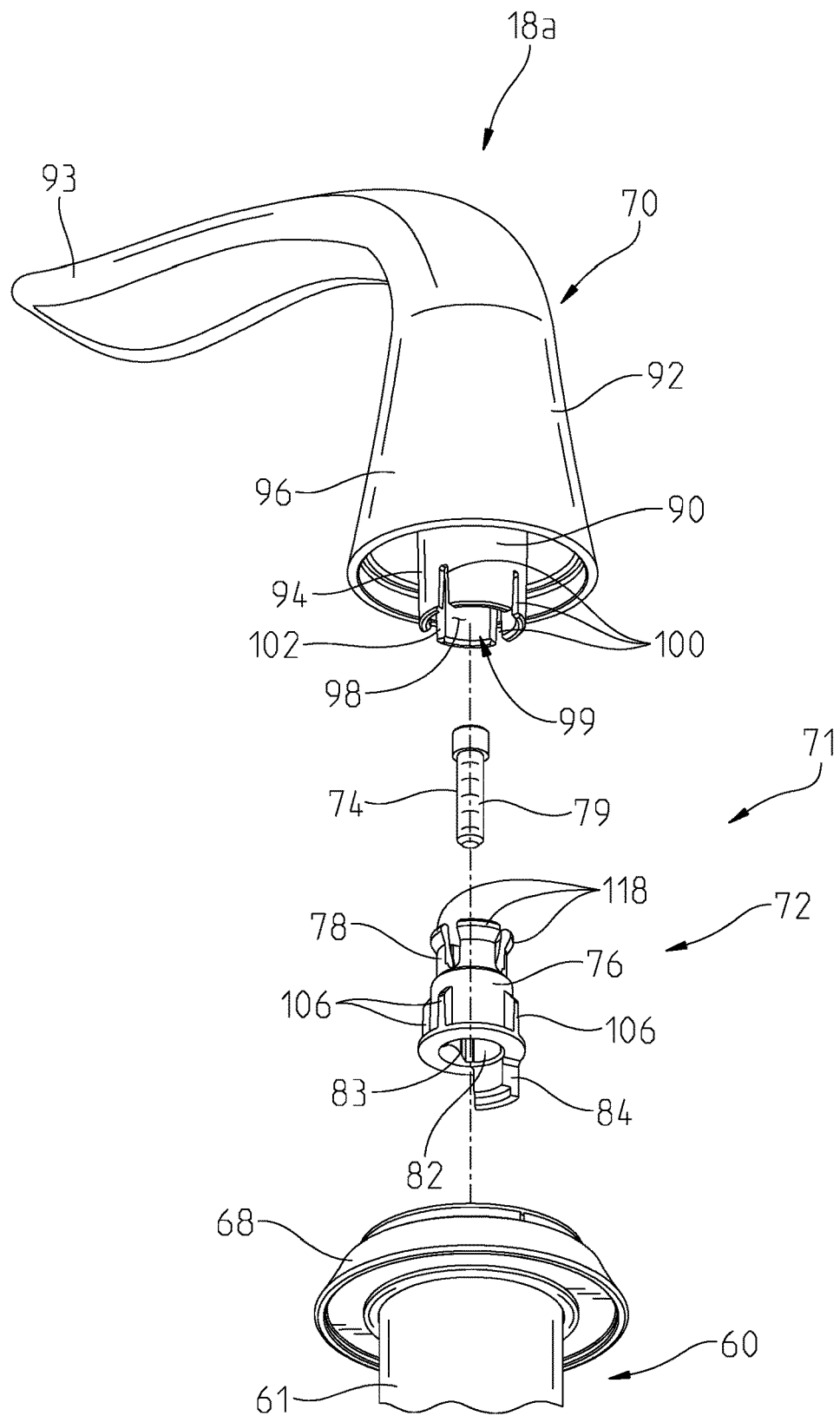
FIG. 5 is a partial lower exploded perspective view of the illustrative faucet handle assembly of FIG. 4.
Figure 6:
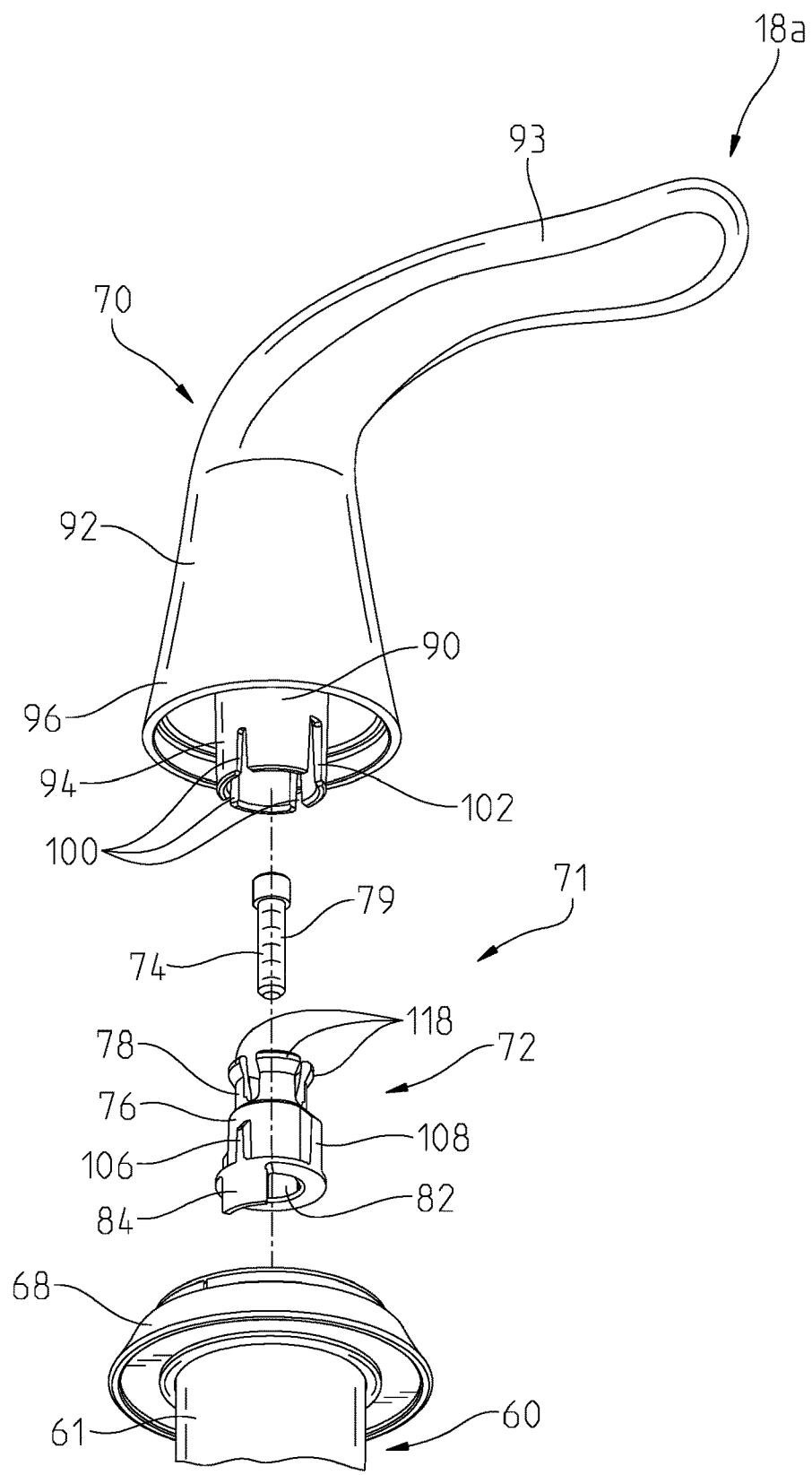
FIG. 6 is a further partial lower exploded perspective view of the illustrative faucet handle assembly of FIG. 4.

A lower opening 82 is defined by the lower body 76 of the handle bushing 72, and receives the valve stem 48. The lower opening 82 illustratively includes a shape (e.g., D-shaped cross-section) configured to cooperate with the valve stem 48. More particularly, the lower opening 82 includes a flat 83 cooperating with the flat 49 of the valve stem 48 (FIGS. 4 and 5). The handle bushing 72 further includes a lower protrusion 84 that is received in the slot 52 of the extension 50 of the valve assembly 44. The coupling of the lower protrusion 84 and the slot 52 supports limited rotation of the handle bushing 72 and hence, the faucet handle assembly 18a (e.g., defining a temperature limit stop). The handle bushing 72 and the valve stem 48 are supported for rotation relative to the mounting shank 60 and the escutcheon 68. Illustratively, a glide ring 86 is positioned intermediate the handle 70 and the escutcheon 68 to prevent contact therebetween (FIGS. 3 and 4). As noted above, the valve assembly 44 is held in place by the bonnet nut 64 including external threads 65 that couple to the inner threads 63 of the mounting shank 60.

With reference to FIGS. 3 and 5-9, the upper portion 42 of the faucet handle assembly 18a includes the handle 70 which, in turn, includes a handle extension 90 positioned radially within an outer housing or body 92. A user interface, such as a lever 93, is illustratively supported by an upper end of the outer body 92. Illustratively, the handle extension 90 includes a downwardly extending cylindrical sidewall 94 at least partially received within an exterior wall 96 of the outer body 92 of the handle 70. The cylindrical sidewall 94 includes an inner surface 98 defining an internal chamber or passage 99 receiving the upper body 78 of the handle bushing 72. Illustratively, a radially outwardly extending recess 101 is formed within the inner surface 98 of the cylindrical sidewall 94 and includes an upwardly facing surface 103 defined by an inwardly extending protrusion 105 (FIG. 3).

Figure 8:
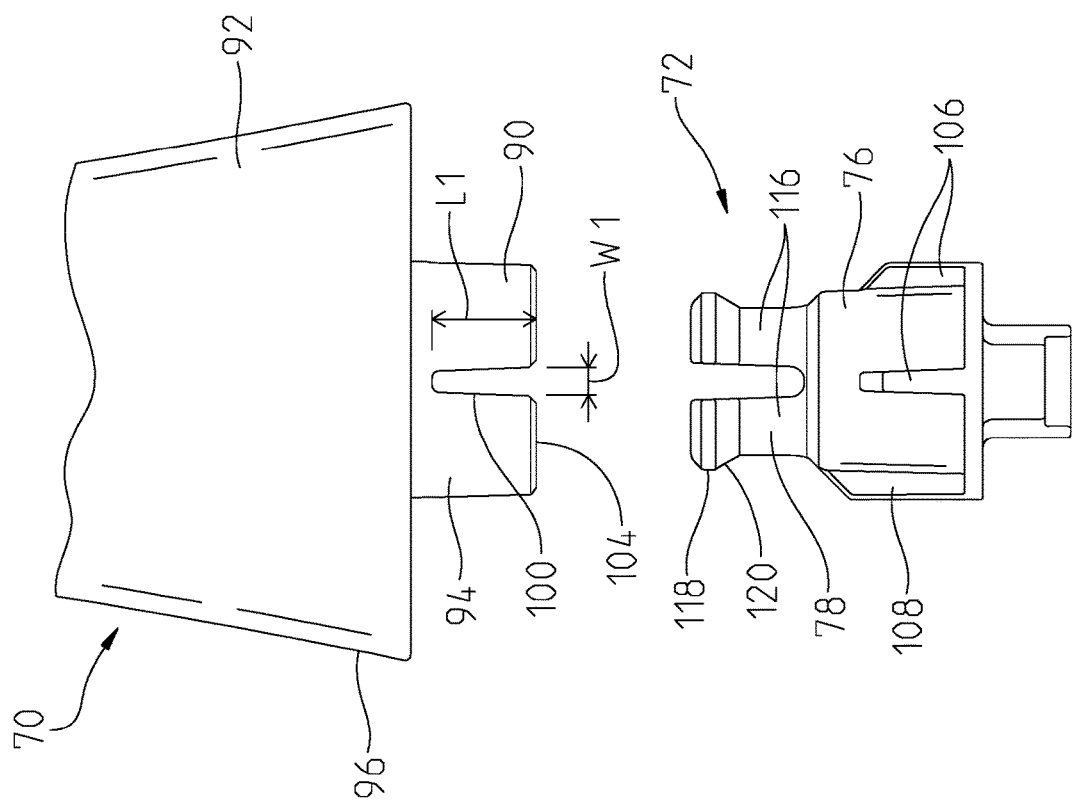
FIG. 8 is a second side elevational view of a handle and a handle bushing of the illustrative faucet handle assembly of FIG. 2, showing the handle bushing uncoupled from the handle.

With further reference to FIGS. 5-9, the handle extension 90 further illustratively includes first or general recesses, illustratively shown as slots 100, and a second or alignment recess, illustratively shown as a slot 102. The slots 100 and 102 are formed within the cylindrical sidewall 94 and are circumferentially spaced from each other. Illustratively, the handle extension 90 is shown with three general slots 100 and one alignment slot 102. Further, the slots 100 and 102 are angularly spaced 90 degrees from each other. However, the number and the positions of the slots 100 and 102 may vary. With reference to FIG. 8, each general slot 100 illustratively begins from a bottom surface 104 of the handle extension 90 and extends upwardly a distance or length of L1. The opening of each general slot 100 is illustratively of a width W1. The length L1 and the width W1 of the general slot 100 define a first slot profile. In one illustrative embodiment, L1 is 0.290 inches, and W1 is 0.067 inches.

The lower body 76 of the handle bushing 72 illustratively includes radially outwardly extending first or general protrusions, illustratively shown as ribs 106. The general slots 100 receive the general ribs 106 to operably couple the handle 70 and handle bushing 72. More particularly, cooperation between the general slots 100 and the general ribs 106 rotationally retain the handle 70 and the handle bushing 72. This cooperation between the handle 70 and the handle bushing 72 provides additional translation of rotational load to reduce stress concentrations.

Figure 7:
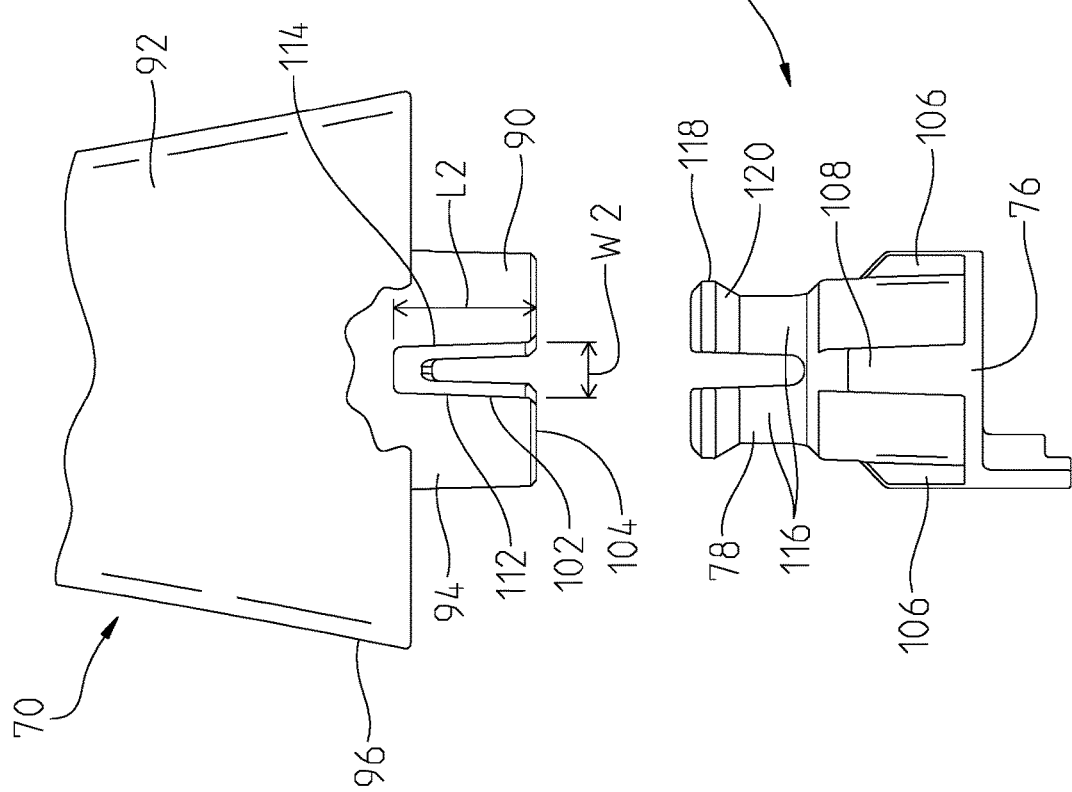
FIG. 7 is a first side elevational view of a handle and a handle bushing of the illustrative faucet handle assembly of FIG. 2, showing the handle bushing uncoupled from the handle.
Figure 9:
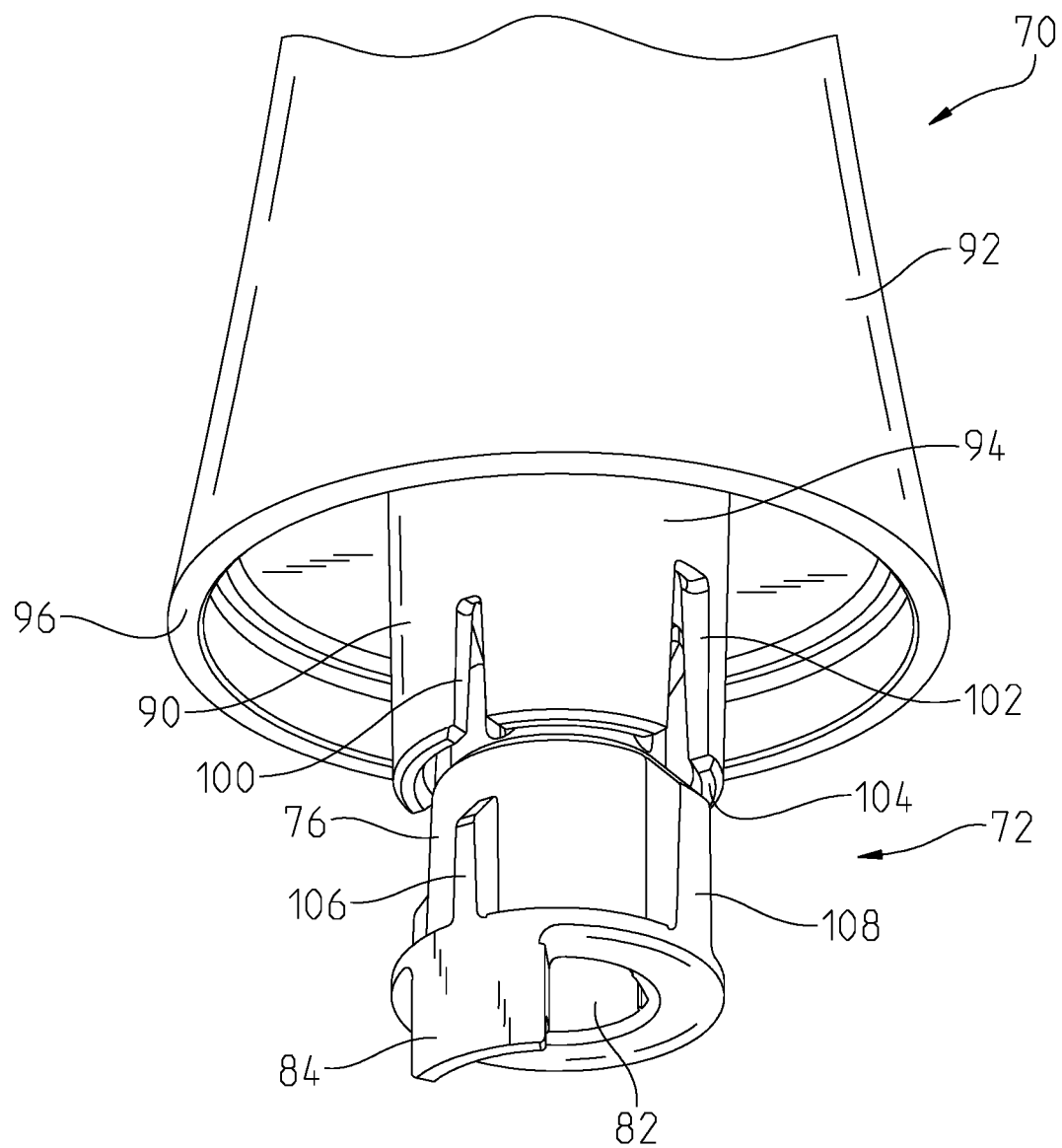
FIG. 9 is a perspective view of a handle and a handle bushing of the illustrative faucet handle assembly of FIG. 2, showing the handle bushing aligned with, but uncoupled from, the handle.

With reference to FIG. 7, the alignment slot 102 illustratively begins from the bottom surface 104 of handle extension 90 and extends a distance or length of L2. The opening of the alignment slot 102 is illustratively of a width W2. The length L2 and the width W2 of the alignment slot 102 define a second slot profile. In one illustrative embodiment, L2 is 0.430 inches, and W2 is 0.122 inches.

The lower body 76 of the handle bushing 72 also includes a radially outwardly extending alignment protrusion, illustratively shown as a rib 108. The ribs 106 and 108 are supported by the cylindrical sidewall 94 and are circumferentially spaced from each other. The alignment slot 102 receives alignment rib 108 to operably couple the handle 70 and handle bushing 72. More particularly, cooperation between the alignment slot 102 and the alignment rib 108 rotationally retain the handle 70 and the handle bushing 72.

The general ribs 106 are configured to distribute rotational movement from the handle 70 to the handle bushing 72. The alignment rib 108 is used to rotationally align the handle 70 to the handle bushing 72 before the handle 70 is secured (e.g., snapped) into place. This alignment rib 108 prevents the handle 70 from being secured in an incorrect orientation, and thus prevents rotational misalignment. In other words, the different configurations (e.g., profiles) of the ribs 106 and 108 facilitate proper rotational orientation of the handle 70 to the valve bushing 72 and the valve stem 48. Illustratively, L2 is taller than L1, and W2 is wider than W1. Thus, the alignment rib 108 is made larger than the general slot 100 which allows the handle 70 to glide over the feature as a user turns the handle 70 to match the alignment features. By having the alignment rib 108 taller than the general rib 106, the alignment slot 102 will not catch the thinner general rib 106 which prevents giving the user a false sense of engagement. Once a user rotates the handle 70 such that the alignment slot 102 tolerances are past the alignment rib 108, tapered sides 112, 114 of alignment slot 102 will allow gravity to drop down the handle 70 as the general ribs 106 interact with the respective general slots 100.

The push fit coupler or interface 71 includes ribs 106 and 108 of unequal width. This unequal width allows for only one orientation for assembly. The interface 71 also includes the widest rib 108 having the largest height or length L2 to prevent unintentional assembly in the incorrect orientation due to material deflection or deformation. This is due to the nature of the assembly of the mating component (i.e. handle 70 with the mating slots 100 and 102). The ribs 106 and 108 are illustratively poke-a-yoked to the handle 70. By having the alignment rib 108 thicker than the other general ribs 106 and tapered for considerable clearance, the user is able to blind assemble the handle 70 by relying on tangible feedback. In one illustrative embodiment, the alignment feature is achieved with ribs 106 and 108 set at unequal angles instead of, or in addition to, different widths lengths to allow for assembly in only one proper orientation.

When the handle 70 illustratively drops into the alignment rib 108, the handle can then be snapped on and operably coupled to the handle bushing 72 through engagement of the upper body 78 of the handle bushing 72 and the recess 101 of the handle More particularly, the upper body 78 of the handle bushing 72 includes a plurality of circumferentially spaced upper tabs 116. The upper tabs 116 illustratively include a protrusion 118 having a downwardly facing surface 120. When the handle 70 is pushed over the handle bushing 72, the upper tabs 116 flex inwardly and ride along the inner surface 98 of the handle extension 90 (FIG. 3). Once the upper tabs 116 are pushed above the protrusion 105, the upper tabs 116 expand radially outwardly, and the downwardly facing surface 120 pushes against upwardly facing surface 103 of the handle extension 90 (FIG. 3). This operably couples the handle 70 and handle bushing 72 and secures the handle assembly 18a in place.

Another illustrative embodiment of a faucet handle assembly 118a is shown in FIGS. 10-19. The faucet handle 118a includes many of the same elements as the faucet handle assembly 18a as detailed above. As such, in the following description, like components are identified with similar reference numbers.

Figure 10:
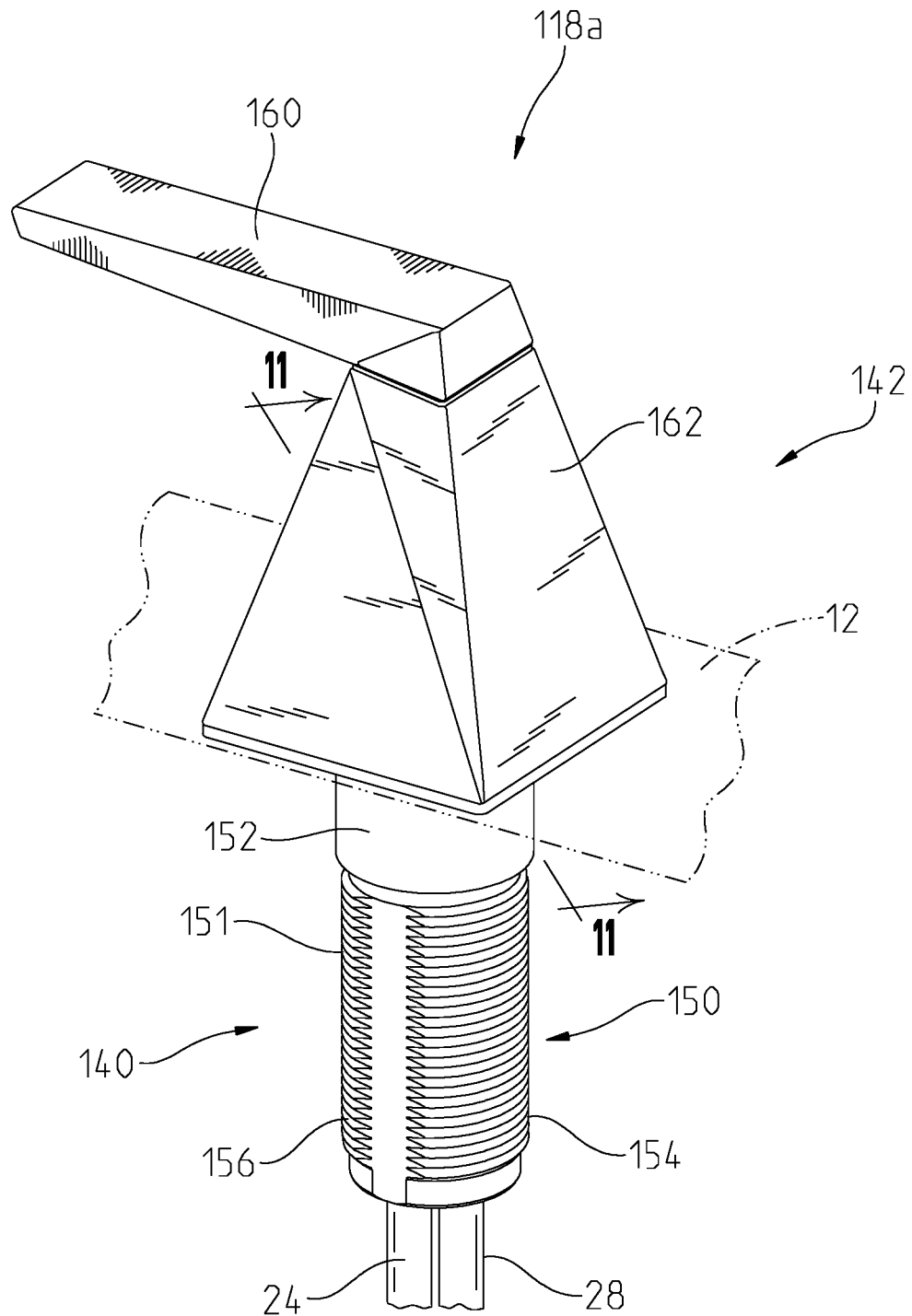
FIG. 10 is a perspective view of another illustrative faucet handle assembly of the present disclosure.
Figure 11:
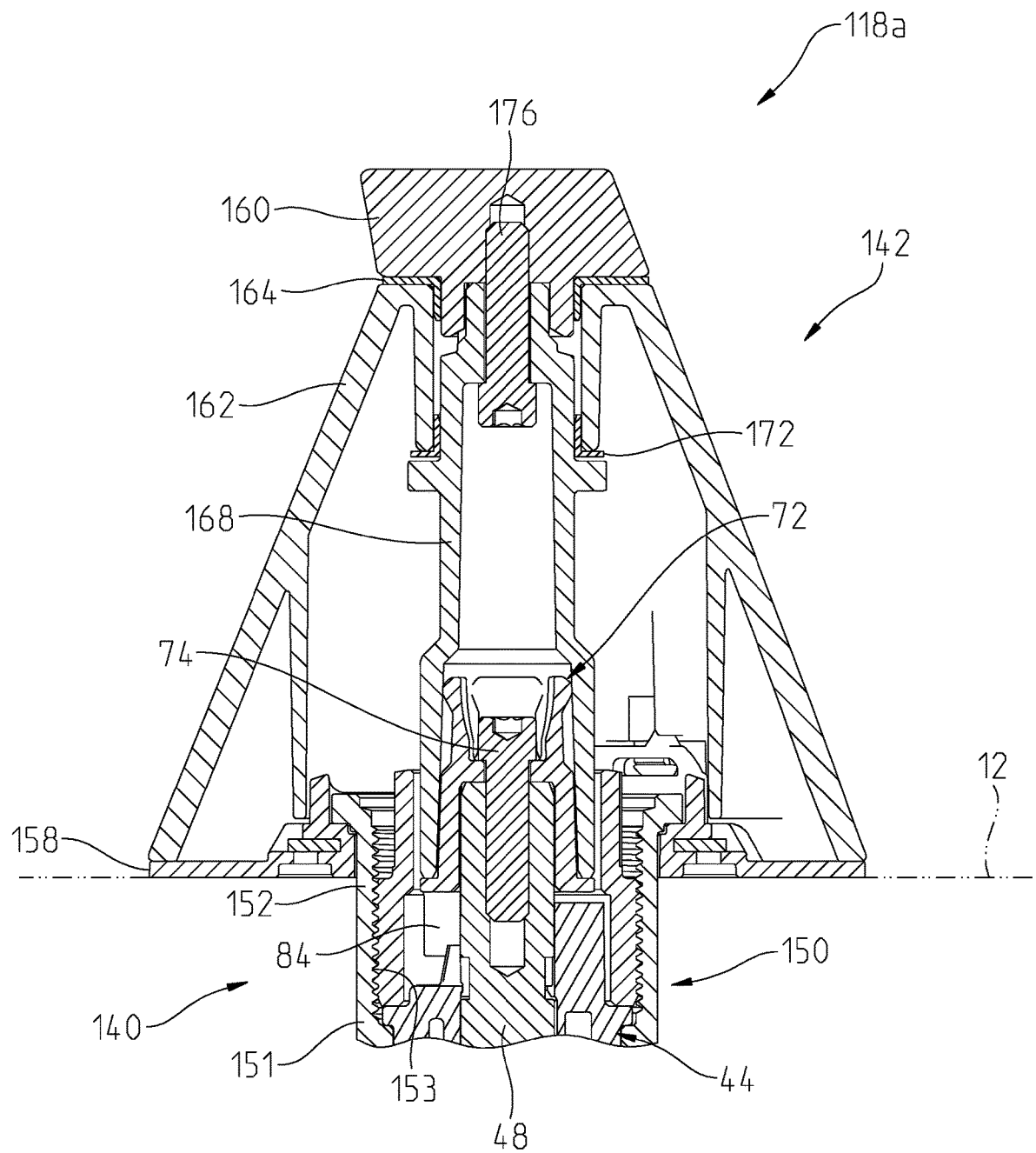
FIG. 11 is a cross-sectional view of the illustrative faucet handle assembly taken along line 11-11 of FIG. 10.
Figure 12:
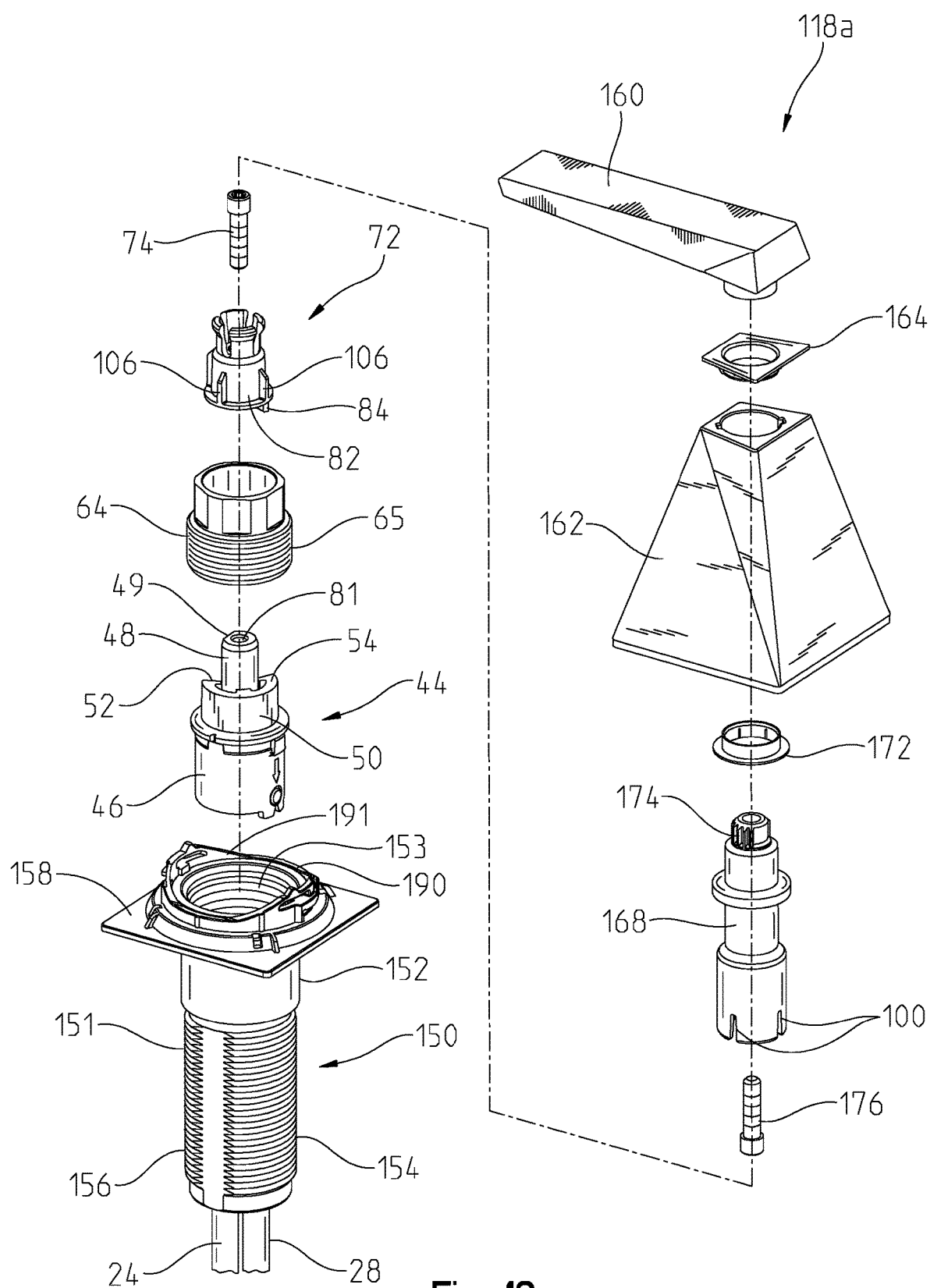
FIG. 12 is an upper exploded perspective view of the illustrative faucet handle assembly of FIG. 10.

Referring further to FIGS. 10-12, the faucet handle assembly 118a illustratively includes a lower portion 140 extending below the sink deck 12, and an upper portion 142 extending above the sink deck 12. The lower portion 140 illustratively includes the flow control valve cartridge or valve assembly 44 fluidly coupled to the hot water inlet conduit 24. The illustrative valve assembly 44 includes the structural elements further detailed above.

The illustrative valve assembly 44 is supported by a valve body or mounting shank 150 including a cylindrical sidewall 151 having an upper portion 152 with internal threads 153. The mounting shank 150 also includes a lower shaft 154 that extends through a mounting aperture (not shown) in the sink deck 12. The lower shaft 154 also includes lower external threads 156 that couple to a mounting nut (not shown) for securing the mounting shank 150 to the sink deck 12. An upper mounting base 158 of the mounting shank 150 is supported above the sink deck 12. The mounting base 158 could be formed of a metal or a polymer.

Figure 13:
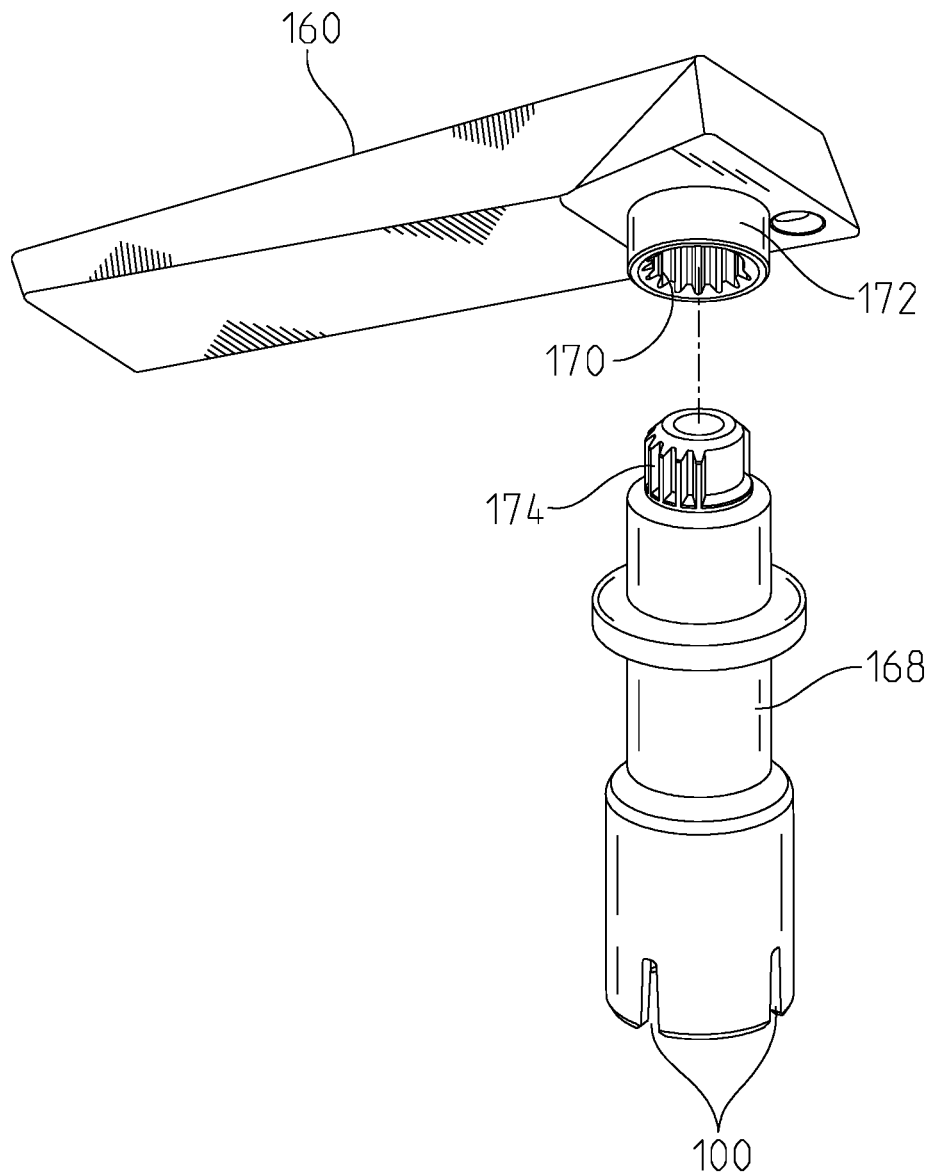
FIG. 13 is an exploded perspective view of an upper portion of the illustrative faucet handle assembly of FIG. 10.
Figure 14:
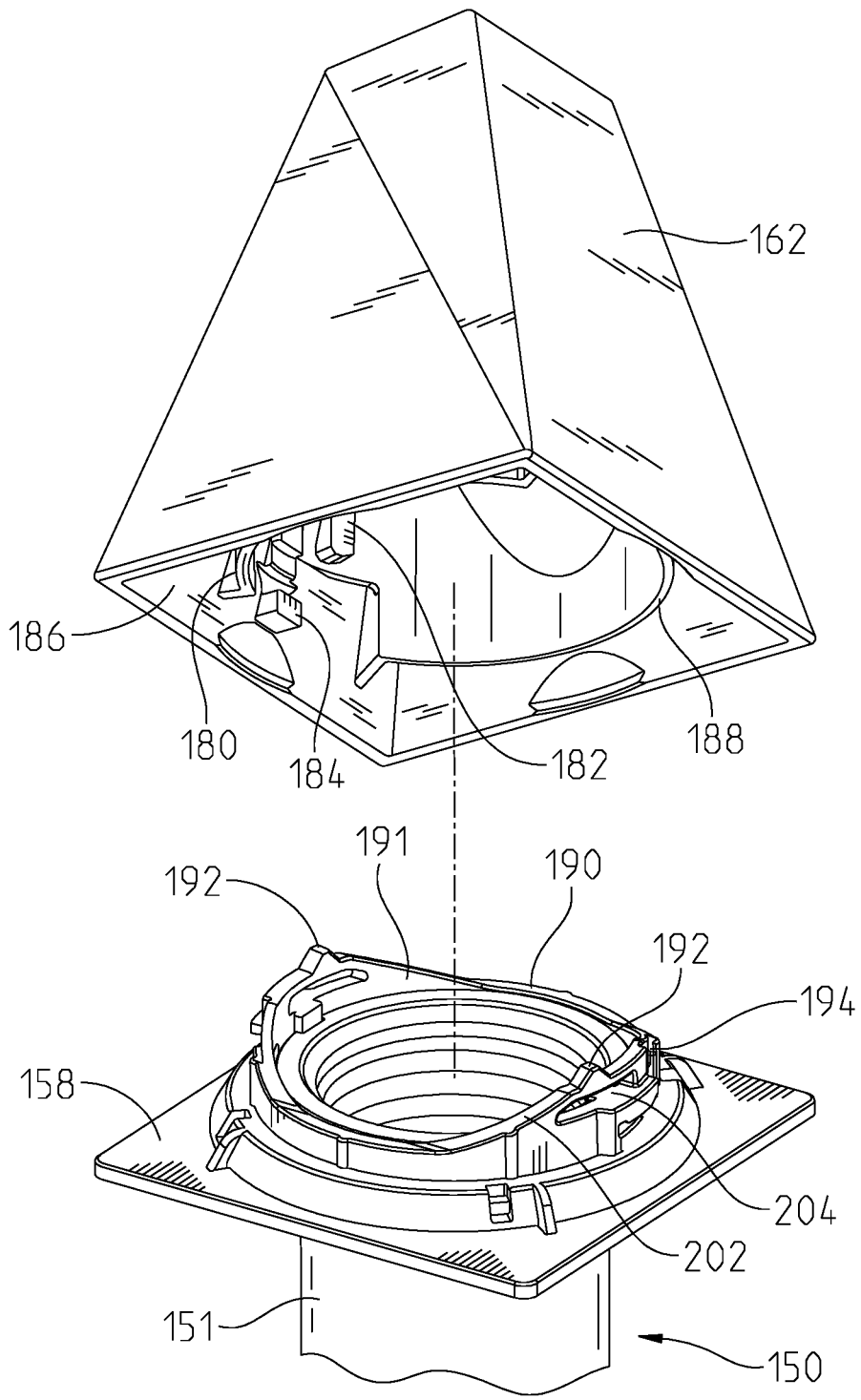
FIG. 14 is a partial exploded perspective view of a handle body and a valve body of the illustrative faucet handle assembly of FIG. 10.
Figure 15:
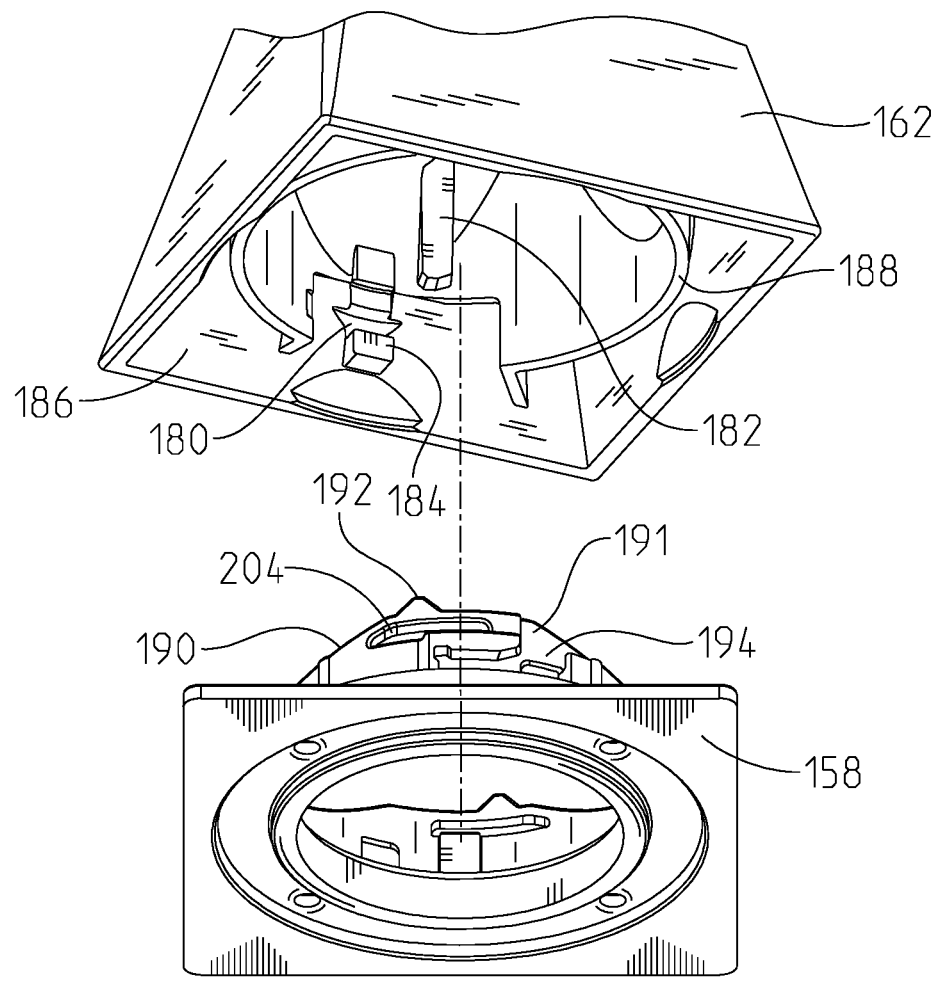
FIG. 15 is another partial exploded perspective view of the handle body and the mounting base of the illustrative faucet assembly of FIG. 14.
Figure 16:
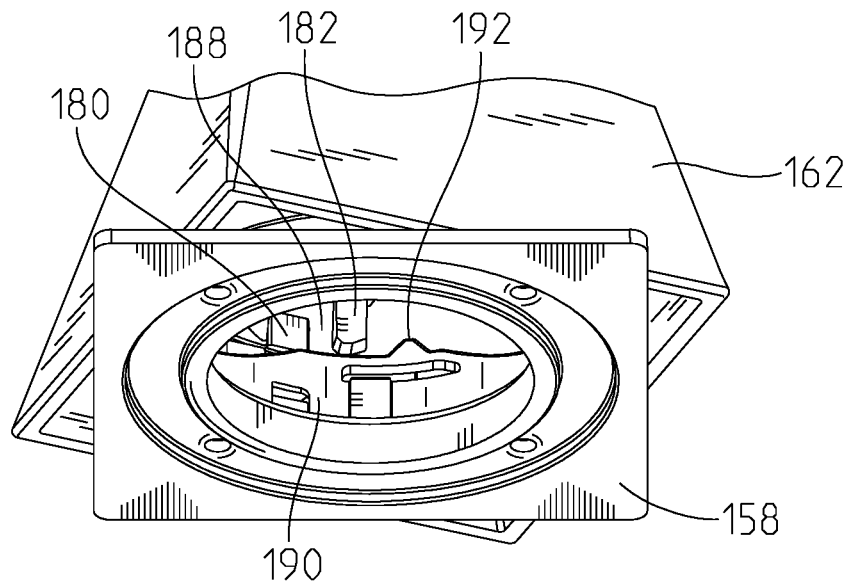
FIG. 16 is a partial perspective view of the handle body and the mounting base of the illustrative faucet assembly of FIG. 14, showing the handle body angularly offset from the mounting base.
Figure 17:
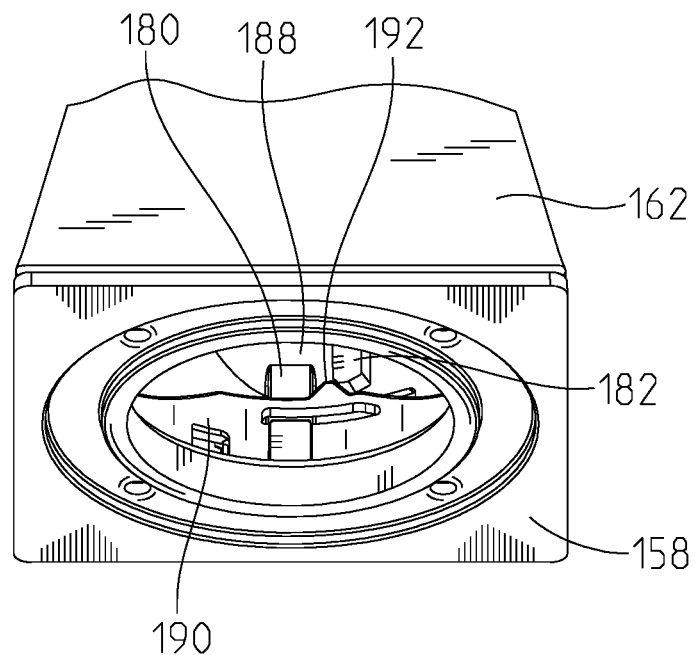
FIG. 17 is another partial perspective view of the handle body and the mounting base of the illustrative faucet assembly of FIG. 14, showing the handle body angularly aligned with the mounting base.

With reference to FIGS. 11-13, the upper portion 142 of the faucet handle assembly 118a illustratively includes a handle lever or blade 160 rotatably supported above a handle body 162. An upper glide ring 164 is positioned intermediate the handle lever 160 and the handle body 162 to prevent contact therebetween. A handle extension 168 is operably coupled to the handle lever 160. More specifically, the handle lever 160 includes internal splines 170 on a protrusion 172 that rotatably couple with external splines 174 on the upper end of the handle extension 168 (FIG. 13). A fastener 176 secures the upper end of the handle extension 168 with the handle lever 160.

A lower end of the handle extension 168 is operably coupled to the valve stem 48 via the handle bushing 72 and the fastener 74. As previously described, the handle bushing 72 includes the lower opening 82 that receives the valve stem 48. The handle bushing 72 further includes the lower protrusion 84 that is received in the slot 52 of the extension 50 of the valve assembly 44. The coupling of the lower protrusion 84 and the slot 52 supports limited rotation of the handle busing 72 and hence, the faucet handle assembly 18a (e.g., defining a temperature limit stop).

The handle bushing 72 and the valve stem 48 are supported for rotation relative to the mounting shank 150 and the handle body 162. Illustratively, a glide ring 172 is positioned intermediate the handle body 162 and the handle extension 168 to prevent contact therebetween (FIGS. 11 and 12). As noted above, the valve assembly 44 is held in place by the bonnet nut 64 including external threads 65 that couple to the inner threads 153 of the mounting shank 150.

The handle extension 168 includes general recesses, illustratively shown as slots 100 and an alignment recess, illustratively shown as slot 102 similar to those previously described for the handle extension 90. The handle extension 168 is illustratively coupled to the handle bushing 72 in the same manner as the handle extension 90 is coupled to the handle bushing 72, as further detailed above.

FIGS. 14-19 provide additional details on coupling of the handle body 162 with the mounting base 158 and the mounting shank 150. The handle body 162 illustratively includes inwardly extending first and second tabs 180 and 182. Illustratively, the first tab 180 includes a rectangular protrusion 184 extending inwardly away from an inner surface or wall 186 of the handle body 162. Additionally, the second tab 182 is a vertical protrusion extending inwardly away from the inner surface or wall 186 of the handle body 162. Similarly, the handle body 162 includes opposing first and second tabs 180 and 182 also protruding inwardly from an inner surface or wall 188 which is directly opposite, and positioned inwardly from, the inner surface 186.

The upper mounting base 158 of the mounting shank 150 illustratively includes a handle mounting hub 190 having a cylindrical sidewall 191 that protrudes upwardly and away from the mounting base 158. The handle mounting hub 190 includes at least one upper protrusion 192. Illustratively, the handle mounting hub 190 includes two diametrically opposed upper protrusions 192 extending above the sidewall 191. The handle mounting hub 190 also includes an axially extending recess or slot 194. Illustratively, the handle mounting hub 190 includes two diametrically opposed slots 194 formed within the sidewall 191.

Figure 18:
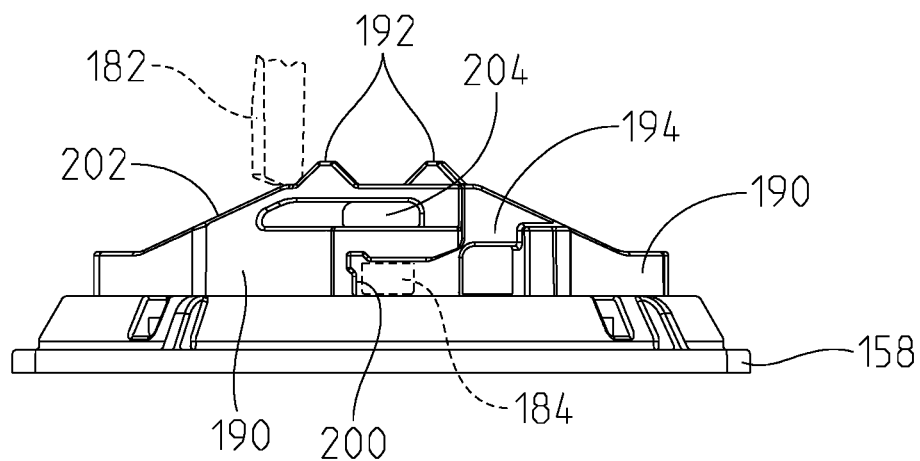
FIG. 18 is a side elevational view of the mounting base of FIG. 14.
Figure 19:
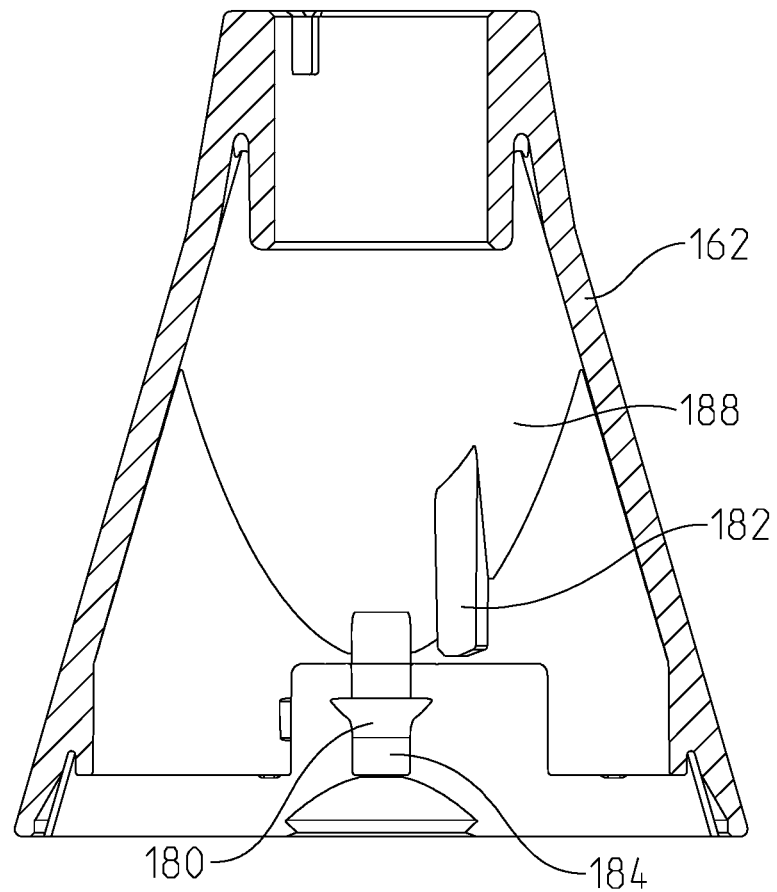
FIG. 19 is a cross-sectional view of the handle body of FIG. 14.

When the handle body 162 is coupled with the handle mounting hub 190, the first tab 180 is inserted into the slot 194 and slid axially downwardly until the protrusion 184 is stopped by a side wall 200 (FIG. 18). This configuration prevents the handle body 162 from moving in the vertical direction and becoming uncoupled from the handle mounting hub 190 by constraining the handle body 162 from rotating clockwise. Simultaneously, the tab 182 is rotated along an upper surface 202 of the handle mounting hub 190 until the tab 182 is pushed over the upper protrusion 192. A relief slot 204 is formed within the sidewall 191 and allows the handle mounting hub 190 to flex and allows the second tab 182 to be pushed over the upper protrusion 192. When the second tab 182 is over upper protrusion 192, it is restrained in the axial direction and prevents the handle body 162 from becoming uncoupled with the handle mounting hub 190 by constraining the handle body 162 from rotating counter-clockwise.

It's important to note that the handle extension 168 will align the handle blade to the base before the handle base is able to drop into the bayonet slot 194. The alignment rib 108 and the slot 102 will first engage, then ribs 106 and slots 100 will engage. Next the protrusion 108 will rest on top of the sidewall 191. The handle body 162 may be rotated until gravity allows the handle body 162 to drop into the slot 194. This order of operation is important as it first aligns the handle blade 160, aligns the handle body 162, and then finally constrains the assembly 118a axially (e.g., vertically) and rationally.

Another illustrative embodiment of a faucet handle assembly 300a is shown in FIGS. 20-24. The faucet handle 300a includes many of the same elements are the faucet handle assembly 18a detailed above. As such, in the following description, like components are identified with similar references numbers.

Figure 20:
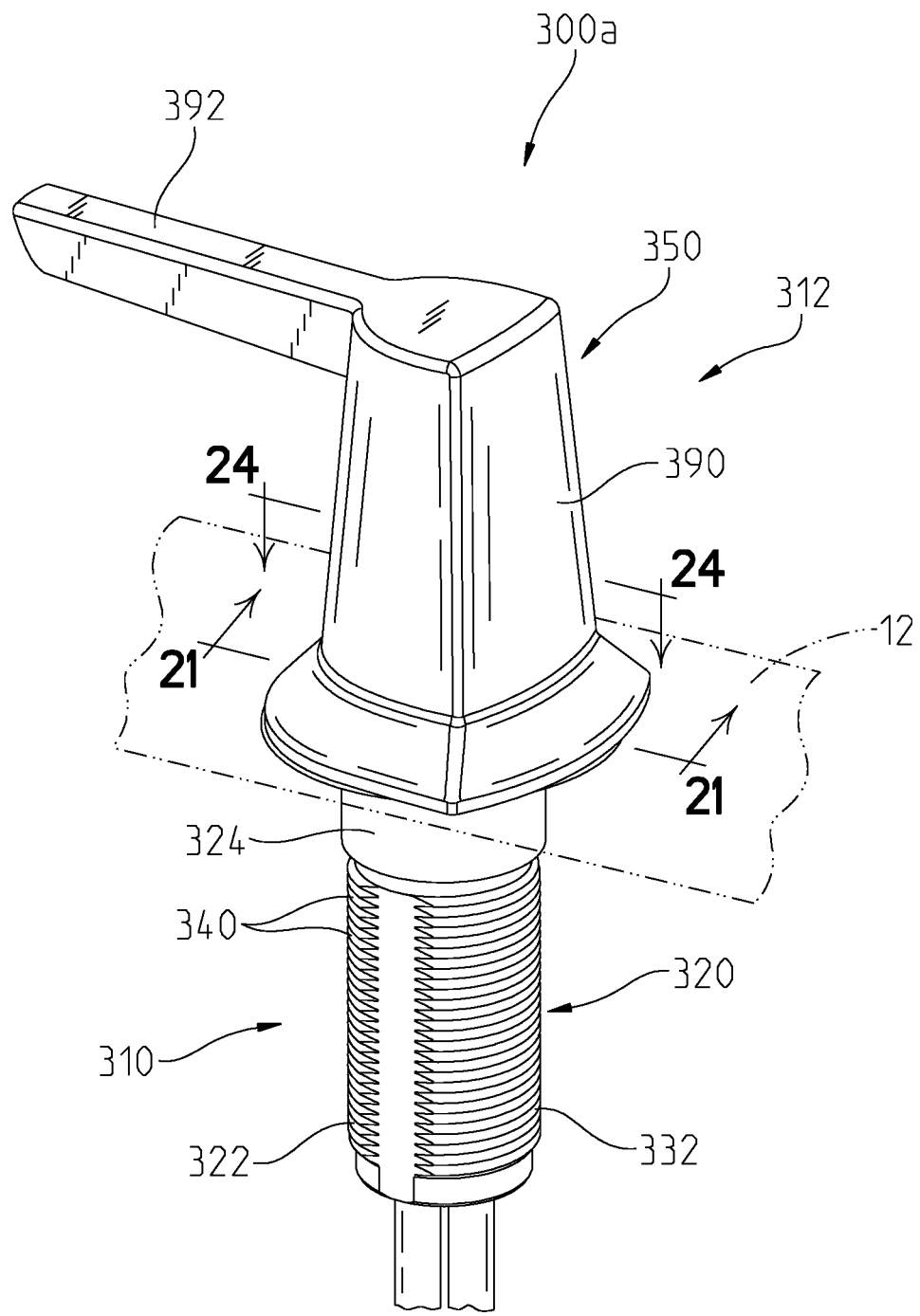
FIG. 20 is a perspective view of a further illustrative faucet handle assembly of the present disclosure.
Figure 21:
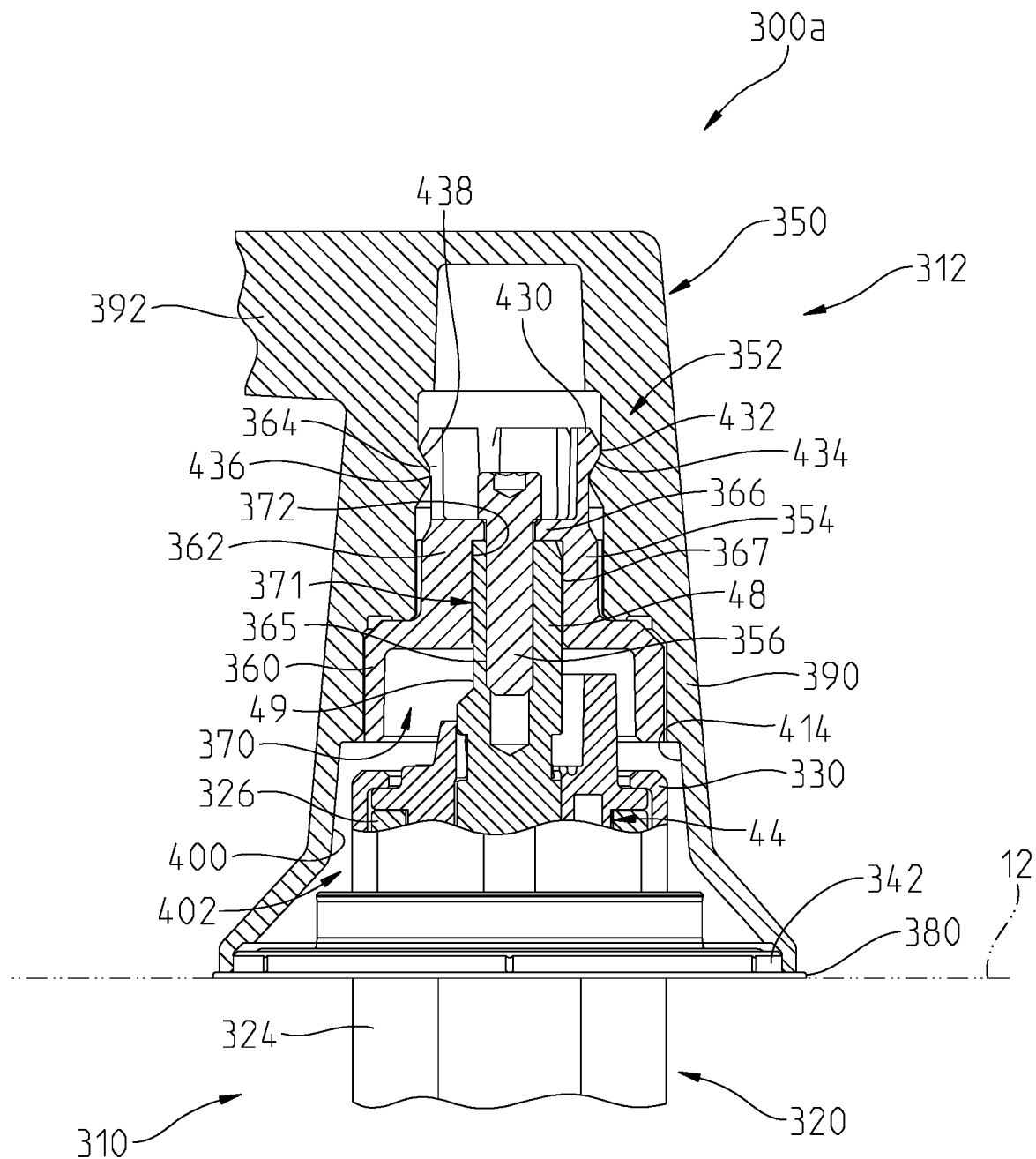
FIG. 21 is a cross-sectional view of the illustrative faucet handle assembly taken along line 21-21 of FIG. 20.

Referring further to FIGS. 20-23, the faucet handle assembly 300a illustratively includes a lower portion 310 extending below the sink deck 12, and an upper portion 312 extending above the sink deck 12 (FIGS. 20 and 21). The lower portion 310 illustratively includes flow control valve cartridge or valve assembly 44 similar to that detailed above in connection with the faucet handle assembly 18a.

Figure 22:
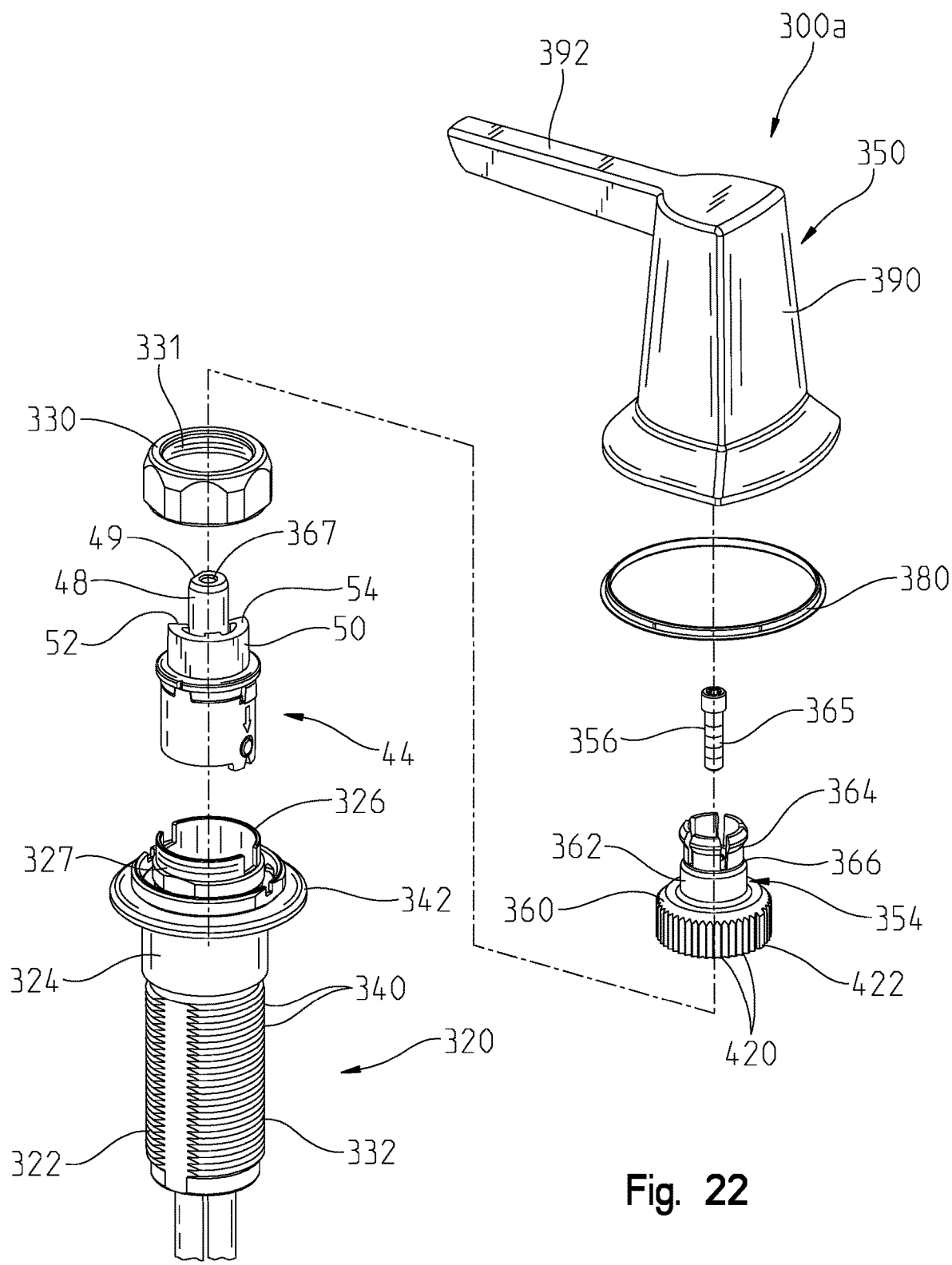
FIG. 22 is an upper exploded perspective view of the illustrative faucet handle assembly of FIG. 20.

The illustrative valve assembly 44 is supported by a valve body or mounting shank 320 including a cylindrical sidewall 322 having an upper portion 324 with an upwardly extending protrusion or side wall 326. Illustratively, a bonnet nut 330 includes internal threads 331 that engage with external threads 327 of the protrusion 326 to secure the valve assembly 44 within the mounting shank 320. As shown in FIG. 22, the mounting shank 320 also includes a lower shaft 332 that extends through a mounting aperture (not shown) in the sink deck 12. The lower shaft 332 includes external threads 340 that couple to a mounting nut (not shown) for securing the mounting shank 320 to the sink deck 12. An upper flange or escutcheon 342 is operably coupled to the mounting shank 320 and is supported above the sink deck 12.

The upper portion 312 of the faucet handle assembly 300a illustratively includes a handle 350 that is operably coupled to the valve stem 48 via a push fit coupler or interface 352 including a handle bushing 354 and a fastener 356 (e.g., a threaded bolt). The illustrative handle bushing 354 includes a lower body 360, a middle body 362, an upper body 364 and a lateral wall 366 positioned between the middle body 362 and the upper body 364. The fastener 356 extends through the lateral wall 366 and includes a threaded shaft 365 threadably received within a threaded opening 367 of the valve stem 48 to secure the handle bushing 354 to the valve stem 48.

With further reference to FIG. 21, a lower opening 370 is defined by the lower body 360 of the handle bushing 354, and receives the valve stem 48. An intermediate opening 371 extends upwardly from the lower opening 370 and illustratively includes a shape (e.g., D-shaped cross-section) configured to cooperate with the valve stem 48. More particularly, the intermediate opening 371 includes a flat 372 cooperating with the flat 49 of the valve stem 48 (FIGS. 22 and 23).

Figure 23:
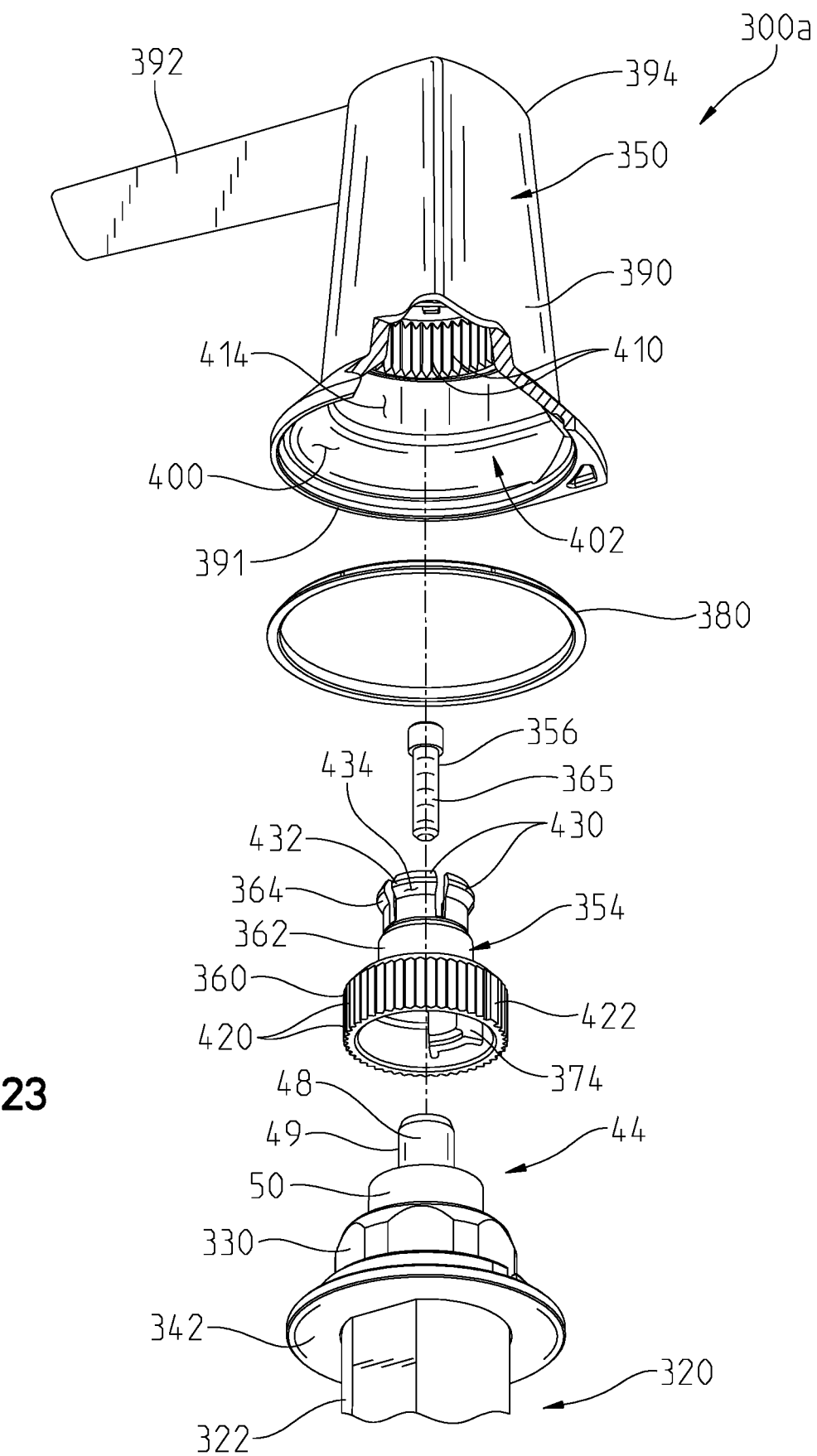
FIG. 23 is a partial lower exploded perspective view of the illustrative faucet handle assembly of FIG. 22.

With further reference to FIGS. 22 and 23, the illustrative handle bushing 354 further includes a lower protrusion 374 that is received in the slot 52 of the extension 50 of the valve assembly 44. The coupling of the lower protrusion 374 and the slot 52 supports limited rotation of the handle bushing 354 and hence, the faucet handle assembly 300a (e.g., defining a temperature limit stop). The handle bushing 354 and the valve stem 48 are supported for rotation relative to the mounting shank 320 and the flange 342. Illustratively, a glide ring 380 is positioned intermediate the handle 350 and the flange 342 to prevent contact therebetween and provide a glide surface. As noted above, the valve assembly 44 is held in place by the bonnet nut 330 by engaging with protrusion 326 of the mounting shank 320.

Figure 24:
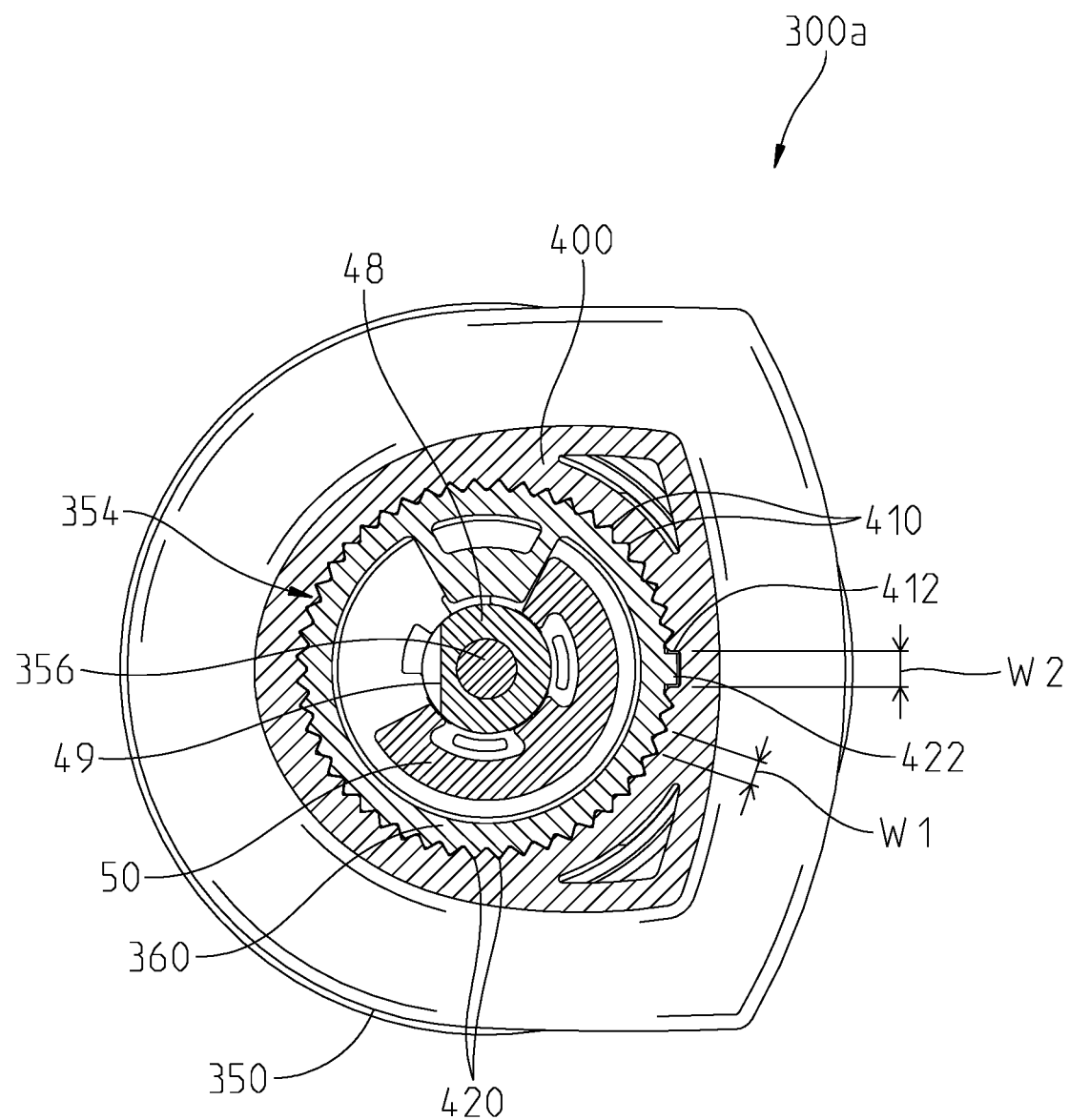
FIG. 24 is a cross-sectional view of the illustrative faucet handle assembly taken along line 24-24 of FIG. 20.

With further reference to FIGS. 23 and 24, the upper portion 312 of the faucet handle assembly 300a includes the handle 350. The illustrative handle 350 includes an outer body 390 defining a lower opening 391. A user interface, such as a lever 392, is illustratively supported by an upper end 394 of the outer body 390. A cylindrical inner wall 400 of the outer body 390 defines an internal chamber or passage 402 receiving the upper body 364 of the handle bushing 354.

The handle 350 further illustratively includes first or general recesses or slots 410, and a second or alignment recess or slot 412. The recesses 410, 412 are illustratively formed within the cylindrical inner wall 400 and extend radially outwardly from an inner surface 414 thereof. Illustratively, the recesses 410, 412 are circumferentially spaced from each other. In an illustrative embodiment, the handle 350 includes a plurality of general recesses 410 and one alignment recess 412. However, the number and position of the recesses 410 and 412 may vary. The illustrative general recesses 410 each have a width W1, and the illustrative alignment recess 412 has a width W2. In one illustrative embodiment, W1 is inches, and W2 is 0.085 inches.

The lower body 360 of the handle bushing 354 illustratively includes outwardly radially extending first or general protrusions, illustratively shown as ribs or splines 420. The general recesses 410 receive the general ribs 420 to operably couple together the handle 350 and the handle bushing 354. More particularly, cooperation between the general recesses 410 and the general ribs 420 rotationally retain the handle 350 and the handle bushing 354. The lower body 360 of the handle bushing 354 also includes a radially outwardly extending alignment protrusion, illustratively shown as rib 422. The ribs 420, 422 are circumferentially spaced from each other. The alignment recess 412 receives the alignment rib 422 to operably couple the handle 350 and the handle bushing 354. Cooperation between the alignment recess 412 and the alignment rib 422 also rotationally retains the handle 350 and the handle bushing 354. The general ribs 420 and alignment rib 422 are functionally similar to general ribs 106 and alignment rib 108, respectively, as detailed above in connection with the faucet handle assembly 18a. Such an arrangement allows for rotational alignment of the handle 250 to the handle bushing 254 as previously described.

More particularly, the alignment rib 422 prevents the handle 350 from being secured in an incorrect orientation, and thus prevents rotational misalignment. In other words, the different configurations (e.g., profiles) of the ribs 420 and 422 facilitate proper rotational orientation of the handle 350 to the valve bushing 354 and the valve stem 48. Illustratively, $W_2$ is wider than $W_1$. Thus, the alignment rib 422 is made larger than the general slots 410 which allows the handle 350 to glide over the feature as a user turns the handle 350 to match the alignment features. Once a user rotates the handle 350 such that the alignment slot 410 tolerances are past the alignment rib 422, alignment slot 412 will allow gravity to drop down the handle 350 as the general ribs 420 interact with the respective general slots 410.

The push fit coupler or interface 352 may include ribs 420 and 422 of unequal width. This unequal width allows for only one orientation for faucet handle assembly 300a. When the handle 350 illustratively drops into the alignment rib 412, the handle 350 can then be snapped on and operably coupled to the handle bushing 354 through engagement of the upper body 364 of the handle bushing 354 and the internal passage 402 of the handle 350. More particularly, the upper body 364 of the handle bushing 354 includes a plurality of circumferentially spaced upper tabs 430. The upper tabs 430 each illustratively include a protrusion 432 having a downwardly facing surface 434. When the handle 350 is pushed over the handle bushing 354, the upper tabs 430 flex inwardly and ride along the inner wall 400 of the handle 350 (FIG. 21). A protrusion 436 extends radially inwardly from the inner wall 400 of the handle 350. Once the upper tabs 430 are pushed above the protrusion 436, the upper tabs 430 expand radially outwardly, and the downwardly facing surface 434 pushes against an upwardly facing surface 438 of the handle 350 (FIG. 21). This operably couples the handle 350 and the handle bushing 354 and secures the faucet handle assembly 300a in place.

Figure 25:
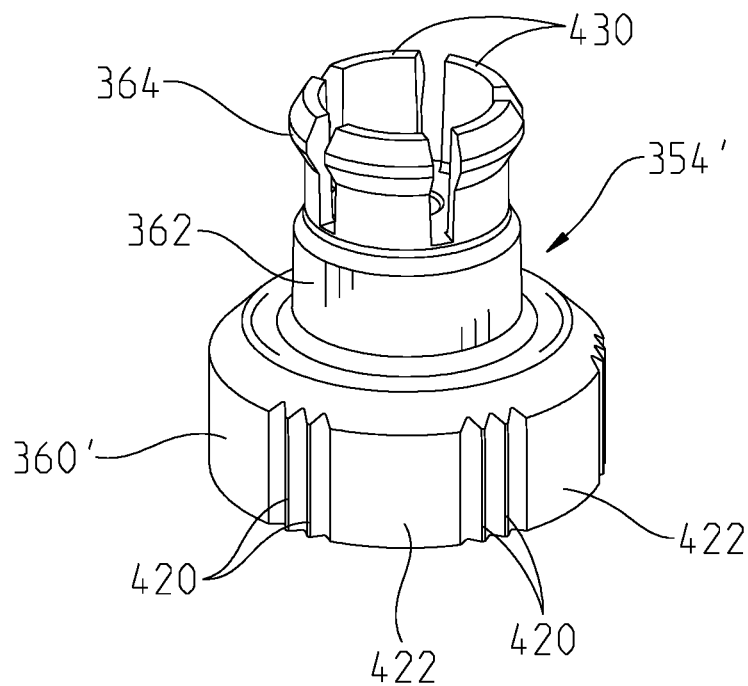
FIG. 25 is an upper perspective view of a further illustrative handle bushing of the present disclosure.
Figure 26:
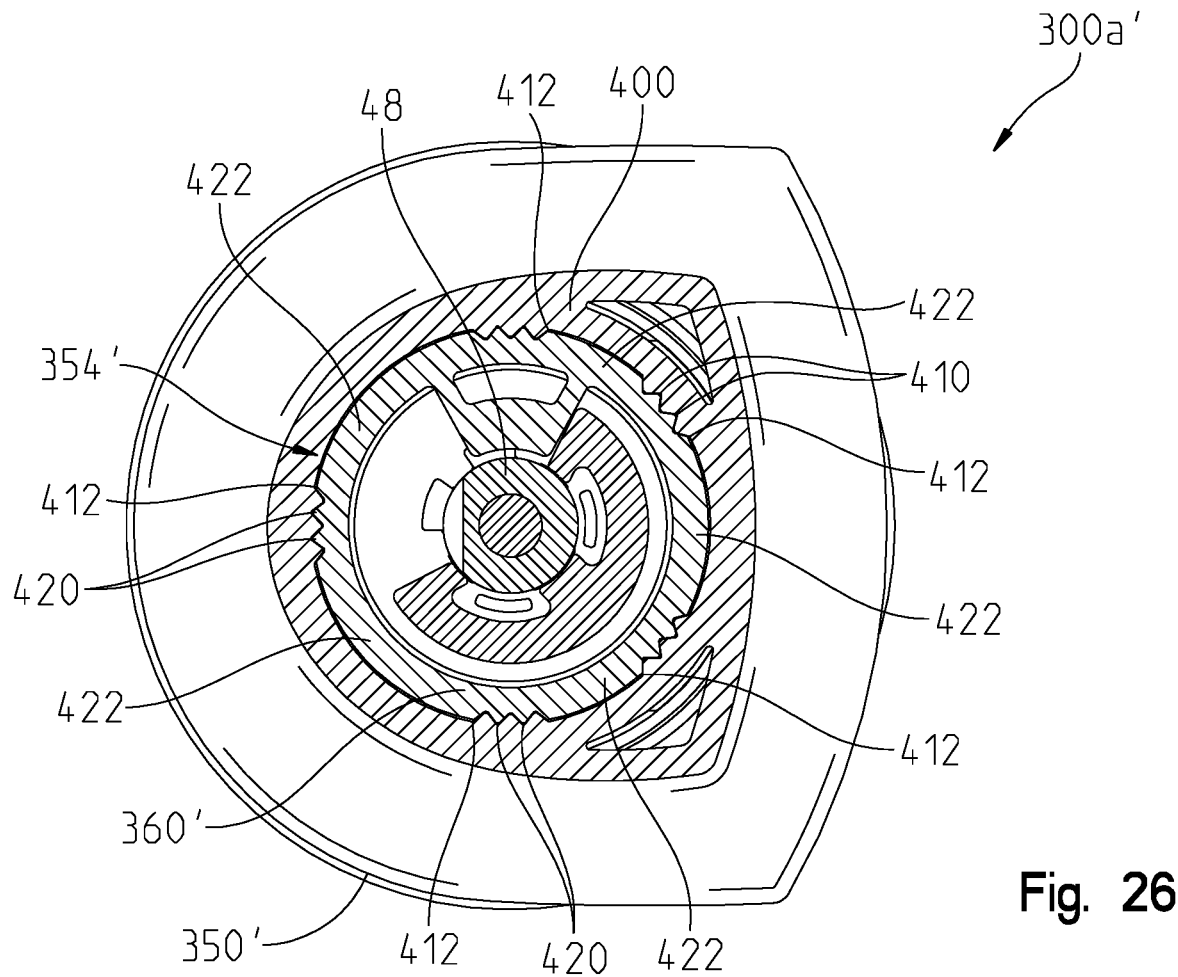
FIG. 26 is a cross-sectional view similar to FIG. 24 of a further illustrative faucet handle assembly including the handle bushing of FIG. 25.

FIGS. 25 and 26 show an alternative illustrative embodiment faucet handle assembly 300a' including a handle 350' and a handle bushing 354', having many similar elements to the faucet handle assembly 300a detailed above. As such, in the following description similar components are identified with like reference numbers.

The number, dimensions and locations of the alignment recesses 412 of the handle 350' and cooperating alignment ribs 422 of the lower body 360' of the handle bushing 354', along with the general recesses 410 of the handle 350' and cooperating splines or ribs 420 of the handle bushing 354', vary from that detailed above in connection with the handle 350 and handle bushing 354. With further reference to FIG. 25, five circumferentially spaced alignment recesses 412 and cooperating alignment ribs 422 may be utilized to rotationally orient the handle 350' relative to the valve bushing 354' (and hence the mounting shank 320). By reducing the number of splines or ribs 420 in selected areas, the number and dimensions of the intermediate ribs 422 are increased. This arrangement facilitates assembly of the handle 350' in a single desired orientation, and supports the handle 350' until it finds that orientation. In other words, this arrangement prevents undesired engagement of the recesses 410 and ribs 420 before such proper orientation has been achieved.

Although the invention has been described in detail with reference to certain preferred embodiments, variations and modifications exist within the spirit and scope of the invention as described and defined in the following claims.

What is claimed is:

1. A faucet handle assembly comprising:
   a valve assembly including a valve stem having a first flat;
   a handle bushing including an upper body, a lower body defining a lower opening configured to cooperate with the valve stem and including a second flat which cooperates with the first flat whereby the lower body is operably coupled to the valve stem, a first rib extending radially outwardly from the lower body and having a first rib profile, and a second rib extending radially outwardly from the lower body in spaced relation to the first rib and having a second rib profile, wherein the first rib profile is different from the second rib profile;
   a handle including a first slot configured to receive the first rib and having a first slot profile and a second slot configured to receive the second rib and having a second slot profile, wherein the first slot profile is different from the second slot profile whereby the proper rotational orientation of the handle to the valve bushing is facilitated;
   wherein the handle bushing further includes a lateral wall extending between the lower body and the upper body, and a fastener extends through the lateral wall to secure the bushing to the valve stem; and
   a coupler defined between the upper body of the handle bushing and the handle, the coupler operably coupling the handle bushing to the handle.

2. The faucet handle assembly of claim 1, wherein the first rib rotationally retains the handle bushing relative to the handle, and the coupler axially retains the handle bushing relative to the handle.

3. The faucet handle assembly of claim 1, wherein the coupler comprises a snap-fit coupler.

4. The faucet handle assembly of claim 3, wherein:
   the snap-fit coupler includes a flexible upper tab supported by the upper body of the handle bushing, the upper flexible tab including a downwardly facing surface; and
   when the handle and the handle bushing are operably coupled together, the downwardly facing surface of the flexible upper tab of the handle bushing is biased against an upwardly facing surface of the handle.

5. The faucet handle assembly of claim 1, wherein:
   the handle includes a handle extension having a cylindrical sidewall with an inner surface defining an internal chamber, and a radially outwardly extending recess formed within the inner surface of the cylindrical sidewall; and
   the handle bushing includes a flexible upper tab having a radially outwardly extending protrusion received within the recess of the handle extension.

6. The faucet handle assembly of claim 5, wherein:
   the lower body of the handle bushing includes a cylindrical sidewall supporting the first rib in circumferentially spaced relation to the second rib; and
   the cylindrical sidewall of the handle extension supports the first slot in circumferentially spaced relation to the second slot.

7. The faucet handle assembly of claim 1, further comprising a mounting shank receiving the valve assembly, and a bonnet nut securing the valve assembly within the mounting shank.

8. The faucet handle assembly of claim 7, further comprising an escutcheon supported by an upper end of the mounting shank.

9. The faucet handle assembly of claim 8, further comprising a glide ring positioned intermediate the escutcheon and the handle.

10. A faucet handle assembly comprising:
    a valve assembly including a valve stem;
    a handle bushing including an upper body, a lower body operably coupled to the valve stem, a first rib extending radially outwardly from the lower body and having a first rib profile, and a second rib extending radially outwardly from the lower body in spaced relation to the first rib and having a second rib profile, wherein the first rib profile is different from the second rib profile, and wherein the lower body of the handle bushing includes a cylindrical sidewall supporting the first rib in circumferentially spaced relation to the second rib;
    a handle including a handle extension having a cylindrical sidewall with an inner surface defining an internal chamber, the cylindrical sidewall supporting a first slot having a first slot profile and a second slot having a second slot profile, wherein the first slot profile is different from the second slot profile and the first slot is circumferentially spaced relative to the second slot; and
    a coupler defined between the upper body of the handle bushing and the handle extension of the handle, the coupler operably coupling the handle bushing to the handle.

11. The faucet handle assembly of claim 10, wherein the handle extension includes a radially outwardly extending recess formed within the inner surface of the cylindrical sidewall of the handle extension; and
    the handle bushing includes a flexible upper tab having a radially outwardly extending protrusion received within the recess of the handle extension.

12. The faucet handle assembly of claim 11, wherein the handle bushing further includes a lateral wall extending between the lower body and the upper body, and a fastener extends through the lateral wall to secure the bushing to the valve stem.

* * * * *